United States Patent
Wang et al.

(10) Patent No.: US 12,532,275 B2
(45) Date of Patent: Jan. 20, 2026

(54) INFORMATION TRANSMISSION METHOD, COMMUNICATION APPARATUS, AND COMPUTER-READABLE STORAGE MEDIUM

(71) Applicant: HUAWEI TECHNOLOGIES CO., LTD., Guangdong (CN)

(72) Inventors: Yu Wang, Hangzhou (CN); Jianwei Zhou, Hangzhou (CN); Yunfei Qiao, Hangzhou (CN); Hejia Luo, Hangzhou (CN); Jun Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 331 days.

(21) Appl. No.: 17/830,863

(22) Filed: Jun. 2, 2022

(65) Prior Publication Data

US 2022/0312355 A1   Sep. 29, 2022

Related U.S. Application Data

(63) Continuation of application No. PCT/CN2020/127769, filed on Nov. 10, 2020.

(30) Foreign Application Priority Data

Dec. 3, 2019 (CN) .......................... 201911219706.6

(51) Int. Cl.
*H04W 48/10* (2009.01)
*H04W 56/00* (2009.01)

(52) U.S. Cl.
CPC ......... *H04W 56/002* (2013.01); *H04W 48/10* (2013.01)

(58) Field of Classification Search
None
See application file for complete search history.

(56) References Cited

U.S. PATENT DOCUMENTS

2013/0217404 A1   8/2013  Jung
2016/0345216 A1*  11/2016 Kishiyama ........ H04W 36/0085
(Continued)

FOREIGN PATENT DOCUMENTS

CN   107211451 A   9/2017
CN   108234005 A   6/2018
(Continued)

OTHER PUBLICATIONS

CATT, "Summary of PDCCH-based Power Saving Signal/Channel," 3GPP TSG RAN WG1 Meeting #99, R1-1913494, Reno, USA, Nov. 18-22, 2019, 39 pages.
(Continued)

*Primary Examiner* — Benjamin Lamont
(74) *Attorney, Agent, or Firm* — Fish & Richardson P.C.

(57) ABSTRACT

The disclosure provides information transmission methods and communication apparatuses. One example method includes that a receiving apparatus receives a synchronization signal and cell-specific information that are sent by a sending apparatus on a first beam, where the cell-specific information includes indication information which indicates whether there is beam-specific information, and the first beam comprises a plurality of second beams. In response to determining that the indication information indicates that there is the beam-specific information, the receiving apparatus receives beam-specific information of second beam of the plurality of second beams, where the beam-specific information is sent by the sending apparatus on the second beam, and the receiving apparatus is within coverage of the second beam. The receiving apparatus performs initial access using the synchronization signal, the cell-specific information, and the beam-specific information.

20 Claims, 17 Drawing Sheets

(56) References Cited

U.S. PATENT DOCUMENTS

| | | | |
|---|---|---|---|
| 2018/0176065 A1* | 6/2018 | Deng | H04W 48/12 |
| 2018/0278319 A1 | 9/2018 | Cezanne et al. | |
| 2019/0082335 A1 | 3/2019 | Yu et al. | |
| 2019/0104549 A1* | 4/2019 | Deng | H04W 52/365 |
| 2019/0246335 A1 | 8/2019 | Mukherjee | |
| 2019/0312629 A1* | 10/2019 | Tang | H04B 7/0695 |
| 2019/0342805 A1 | 11/2019 | Hao et al. | |
| 2019/0349960 A1* | 11/2019 | Li | H04L 5/0055 |
| 2020/0053672 A1* | 2/2020 | Tang | H04B 7/0695 |
| 2020/0136709 A1* | 4/2020 | Wang | H04B 7/0695 |
| 2020/0305099 A1* | 9/2020 | Liu | H04B 7/0617 |
| 2021/0067978 A1* | 3/2021 | Cheraghi | H04B 17/336 |

FOREIGN PATENT DOCUMENTS

| | | |
|---|---|---|
| CN | 108370290 A | 8/2018 |
| CN | 109478913 A | 3/2019 |
| CN | 109842434 A | 6/2019 |
| CN | 110291750 A | 9/2019 |
| WO | 2019056210 A1 | 3/2019 |

OTHER PUBLICATIONS

Huawei et al., "Discussion on 2-step RACH procedure," 3GPP TSG RAN WG1 Meeting #97, R1-1906051, Reno, USA, May 13-17, 2019, 12 pages.
Office Action issued in Chinese Application No. 201911219706.6 on Dec. 1, 2021, 7 pages (with English translation).
PCT International Search Report and Written Opinion issued in International Application No. PCT/CN2020/127769 on Feb. 18, 2021, 13 pages (with English translation).
Extended European Search Report in European Appln No. 20896687.9, dated Nov. 29, 2022, 8 pages.

* cited by examiner

INFORMATION TRANSMISSION METHOD, COMMUNICATION APPARATUS, AND COMPUTER-READABLE STORAGE MEDIUM

CROSS-REFERENCE TO RELATED APPLICATIONS

This application is a continuation of International Application No. PCT/CN2020/127769, filed on Nov. 10, 2020, which claims priority to Chinese Patent Application No. 201911219706.6 filed on Dec. 3, 2019. The disclosures of the aforementioned applications are hereby incorporated by reference in their entireties.

TECHNICAL FIELD

This application relates to the field of communication technologies, and in particular, to an information transmission method, a communication apparatus, and a computer-readable storage medium.

BACKGROUND

When a terminal device performs initial access, the terminal device and a network device need to perform beam scanning, so that quality of a signal from the network device received by the terminal device in a beam direction is optimal.

In a process in which the terminal device determines the beam direction, the network device may send synchronization signal and physical broadcast channel (PBCH) blocks (SSB) in a plurality of different beam directions in time division. Because the SSB sent by the network device each time includes a synchronization signal and broadcast information, resource overheads required for sending the SSB by the network device are large.

SUMMARY

This application provides an information transmission method, a communication apparatus, and a computer-readable storage medium, to reduce resource overheads of broadcasting signaling by a sending apparatus.

According to a first aspect, this application provides an information transmission method, where the method includes: A receiving apparatus receives a synchronization signal and cell-specific information that are sent by a sending apparatus on a first beam, where the cell-specific information includes indication information, and the indication information indicates whether there is beam-specific information; and if the indication information indicates that there is the beam-specific information, the receiving apparatus receives beam-specific information that is of a second beam and that is sent by the sending apparatus on the second beam. The receiving apparatus may perform initial access based on the synchronization signal, the cell-specific information, and the beam-specific information, where the first beam includes a plurality of second beams, and the receiving apparatus is within coverage of the second beam. According to the solution provided in this embodiment, redundancy of information sent by the sending apparatus in time division on the first beam and the plurality of second beams included in the first beam can be greatly reduced, thereby reducing resource overheads of broadcasting signaling by the sending apparatus.

In a possible design, the beam-specific information of the second beam includes at least one of the following; a space identifier, a frequency identifier, a time identifier, a beam-characteristic identifier, a demodulation reference signal (DMRS) position identifier, and check information of the second beam. According to the solution provided in this embodiment, the beam-specific information of the second beam may uniquely identify the second beam. In addition, the beam-specific information may not include a synchronization signal and a master information block (MIB). Therefore, a data amount of the beam-specific information is less than a data amount of an SSB. Therefore, resource overheads of broadcasting signaling by the sending apparatus are reduced.

In a possible design, the beam-characteristic identifier identifies at least one of a shape, an opening angle, a timing advance, a polarization manner, or a beam level of the second beam. The beam level indicates a level of the beam.

In a possible design, a beam identifier of the second beam includes the time identifier, and at least one of the space identifier and the frequency identifier. According to the solution provided in this embodiment, a plurality of beams that exist at the same time, on a same frequency, and in different spaces may be distinguished. This implements a beam identification method of a next-generation larger-scale beam communication system, and improves beam identification precision.

In a possible design, the synchronization signal includes at least one of a primary synchronization signal and a secondary synchronization signal.

In a possible design, the cell-specific information includes an MIB. According to the solution provided in this embodiment, when the indication information in the cell-specific information indicates that there is no beam-specific information, a synchronization signal broadcast by a network device on a wide beam and the cell-specific information are equivalent to an SSB in an NR (new radio) system. Therefore, the information transmission method provided in this application may be compatible with an SSB configuration method in an NR protocol.

In a possible design, the cell-specific information is periodic broadcast information.

In a possible design, the receiving apparatus may further determine location information of the second beam based on the space identifier of the second beam. The receiving apparatus adjusts a beam direction of the receiving apparatus based on the location information of the second beam and location information of the receiving apparatus. Therefore, a delay of beam alignment of a terminal device may be reduced, and beam alignment accuracy may be improved.

According to a second aspect, this application provides an information transmission method, where the method includes: A receiving apparatus determines a space location of a beam based on a space identifier of the beam to which the receiving apparatus belongs, and further determines a beam adjacent to the beam based on the space location of the beam, and the receiving apparatus performs beam switching by measuring the adjacent beam.

In a possible design, the space identifier of the beam is in a one-to-one correspondence with the space location of the beam.

In a possible design, the receiving apparatus determines the beam adjacent to the beam based on the space identifier of the beam.

According to a third aspect, this application provides an information transmission method, where the method includes: A sending apparatus sends a synchronization signal and cell-specific information on a first beam, where the cell-specific information includes indication information, and the indication information indicates whether there is beam-specific information, and if the indication information indicates that there is the beam-specific information, the sending apparatus sends beam-specific information of a second beam on any second beam, where the synchronization signal, the cell-specific information, and the beam-specific information are used by a receiving apparatus to perform initial access, and the first beam includes a plurality of second beams.

In a possible design, the beam-specific information of the second beam includes at least one of the following: a space identifier, a frequency identifier, a time identifier, a beam-characteristic identifier, a DMRS position identifier, and check information of the second beam.

In a possible design, the beam-characteristic identifier identifies at least one of a shape, an opening angle, a timing advance, a polarization manner, or a beam level of the second beam, and the beam level indicates a level of the beam.

In a possible design, a beam identifier of the second beam includes the time identifier, and at least one of the space identifier and the frequency identifier.

In a possible design, the synchronization signal includes at least one of a primary synchronization signal and a secondary synchronization signal.

In a possible design, the cell-specific information includes an MIB.

In a possible design, the cell-specific information is periodic broadcast information.

According to a fourth aspect, this application provides a communication apparatus, including a module, a component, or a circuit configured to implement the method according to the first aspect, the second aspect, or the third aspect.

According to a fifth aspect, this application provides a communication apparatus, including:

an interface and a processor, where the interface is coupled to the processor; and the processor is configured to execute a computer program or instructions in a memory, so that the method according to the first aspect, the second aspect, or the third aspect is performed.

In a possible design, the communication apparatus in the fifth aspect may be a terminal device, a network device, or a chip. The interface and the processor may be integrated on a same chip, or may be separately disposed on different chips.

In a possible design, the communication apparatus in the fifth aspect may further include the memory, and the memory is configured to store the computer program or the instructions. The memory and the processor are integrated on a same chip, or may be separately disposed on different chips.

According to a sixth aspect, this application provides a communication apparatus, including:

a processor and a transceiver, where the processor and the transceiver communicate with each other through internal connection;

the processor is configured to execute a computer program or instructions in a memory, so that the method according to the first aspect, the second aspect, or the third aspect is performed; and the transceiver is configured to perform the transceiver step in the method according to the first aspect, the second aspect, or the third aspect.

In a possible design, the communication apparatus in the sixth aspect may be a network device or a terminal device, or may be a component (for example, a chip or a circuit) of the network device or the terminal device.

According to a seventh aspect, this application provides a communication apparatus, including a processor and a memory, where the processor and the memory are coupled;

the memory is configured to store a computer program or instructions; and the processor is configured to execute the computer program or the instructions stored in the memory, so that the communication apparatus performs the method according to the first aspect, the second aspect, or the third aspect.

According to an eighth aspect, this application provides a communication apparatus, including a processor, a memory, and a transceiver;

the memory is configured to store a computer program or instructions; and the processor is configured to execute the computer program or the instructions stored in the memory, so that the communication apparatus performs the method according to the first aspect, the second aspect, or the third aspect.

According to a ninth aspect, this application provides a communication apparatus, including an input interface circuit, a logic circuit, and an output interface circuit, where the input interface circuit is configured to obtain to-be-processed data; the logic circuit is configured to perform the method according to the first aspect, the second aspect, or the third aspect to process the to-be-processed data, to obtain processed data; and the output interface circuit is configured to output the processed data.

According to a tenth aspect, this application provides a computer-readable storage medium, including a computer program or instructions. When the computer program or the instructions is/are run on a computer, the method according to the first aspect, the second aspect, or the third aspect is performed.

According to an eleventh aspect, this application provides a computer program, including a program or instructions. When the program or the instructions is/are run on a computer, the method according to the first aspect, the second aspect, or the third aspect is performed.

In a possible design, all or a part of the computer programs in the eleventh aspect may be stored in a storage medium encapsulated with a processor, or some or all of the programs may be stored in a memory that is not encapsulated with a processor.

According to a twelfth aspect, this application provides a computer program product, where the computer program product includes a computer program or instructions, and when the computer program or the instructions is/are run on a computer, the method according to the first aspect, the second aspect, or the third aspect is performed.

According to a thirteenth aspect, embodiment of this application further provide a system, including the receiving apparatus and the sending apparatus according to the first aspect, the second aspect, or the third aspect.

According to a fourteenth aspect, embodiment of this application further provide a processor. The processor includes at least one circuit, configured to perform the method according to the first aspect, the second aspect, or the third aspect.

It can be learned that in the foregoing aspects, a sending apparatus sends a synchronization signal and cell-specific information on a first beam. When indication information included in the cell-specific information indicates that there is beam-specific information, the sending apparatus sends beam-specific information of a second beam on any second beam included in the first beam. Because the beam-specific information does not include the synchronization information or an MIB, and the beam-specific information may identify, the second beam, redundancy of information sent by the sending apparatus in time division on the first beam and a plurality of second beams included in the first beam is greatly reduced, thereby reducing resource overheads of broadcasting signaling by the sending apparatus.

DESCRIPTION OF EMBODIMENTS

Terms used in implementations of this application are merely used to explain specific embodiments of this application, but are not intended to limit this application.

Figure 1:
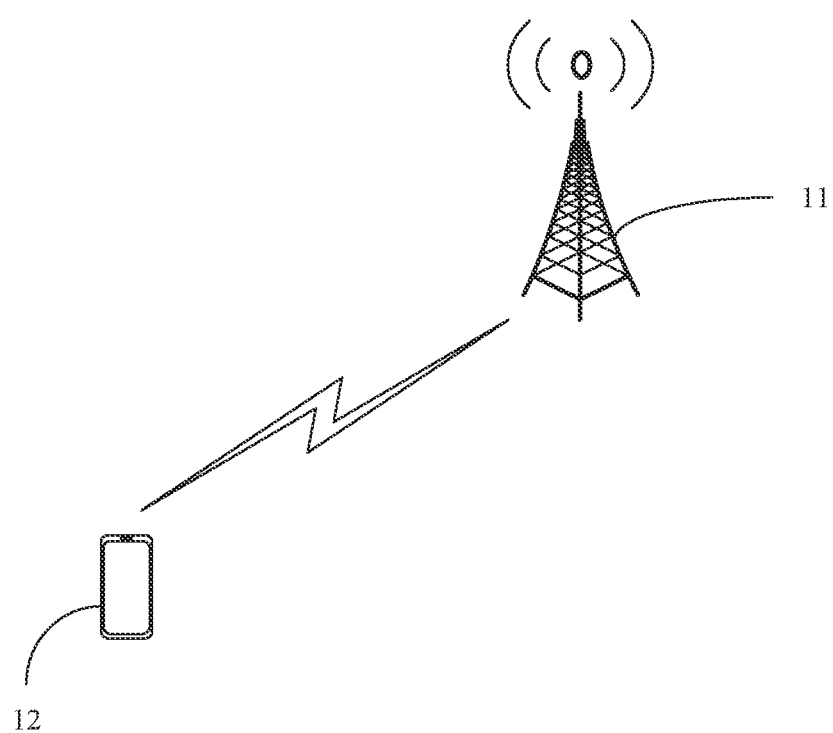
FIG. 1 is a schematic diagram of an application scenario according to an embodiment of this application.

Embodiments of this application may be applied to various communication systems. FIG. 1 is a schematic diagram of an application scenario according to an embodiment of this application. A communication system shown in FIG. 1 mainly includes a network device 11 and a terminal device 12.

(1) The network device 11 may be a network side device, for example, an access point (AP) of a wireless local area network (WLAN), an evolved NodeB (eNB or eNodeB) of 4G. or a base station for next generation communication, for example, a 5G new radio access technology (NR) base station (next generation Node B, gNB), a small cell, or a micro cell, or may also be a relay station, a transmission and reception point (TRP), a roadside unit (RSU), or the like. For distinction, a base station in a 4G communication system is referred to as a long term evolution (LTE) eNB, and a base station in a 5G communication system is referred to as an NR gNB. Some base stations may support both a 4G communication system and a 5G communication system. In addition, these names of the base stations are only for ease of distinguishing, and are not limited in meaning.

(2) The terminal device 12 is also referred to as user equipment (UE), and is a device that provides voice and/or data connectivity for a user, for example, a handheld device with a wireless connection function, a vehicle-mounted device, or a vehicle with a vehicle-to-vehicle (V2V) communication capability. Common terminal devices include a mobile phone, a tablet, a notebook computer, a palmtop computer, a mobile internet device (MID), a wearable device such as a smartwatch, a smart band, or a pedometer, and the like.

(3) The term "a plurality of" indicates two or more, and another quantifier is similar to the term "a plurality of". The term "and/or" describes an association relationship for describing associated objects and represents that three relationships may exist. For example, A and/or B may represent the following three cases: Only A exists, both A and B exist, and only B exists. The character "/" usually indicates an "or" relationship between the associated objects.

It should be noted that a quantity of terminal devices 12 included in the communication system shown in FIG. 1 and types of the terminal devices 12 are merely an example. This embodiment of this application is not limited thereto. For example, the communication system may further include more terminal devices 12 that communicate with the network device 11. For brevity, details are not described in the accompanying drawings. In addition, although the network device 11 and the terminal device 12 are shown in the communication system shown in FIG. 1, the communication system may not be limited to the network device 11 and the terminal device 12, for example, may further include a core network node, or a device configured to carry a virtualized network function. This is clear to a person of ordinary skill in the art, and details are not described herein.

Figure 2:
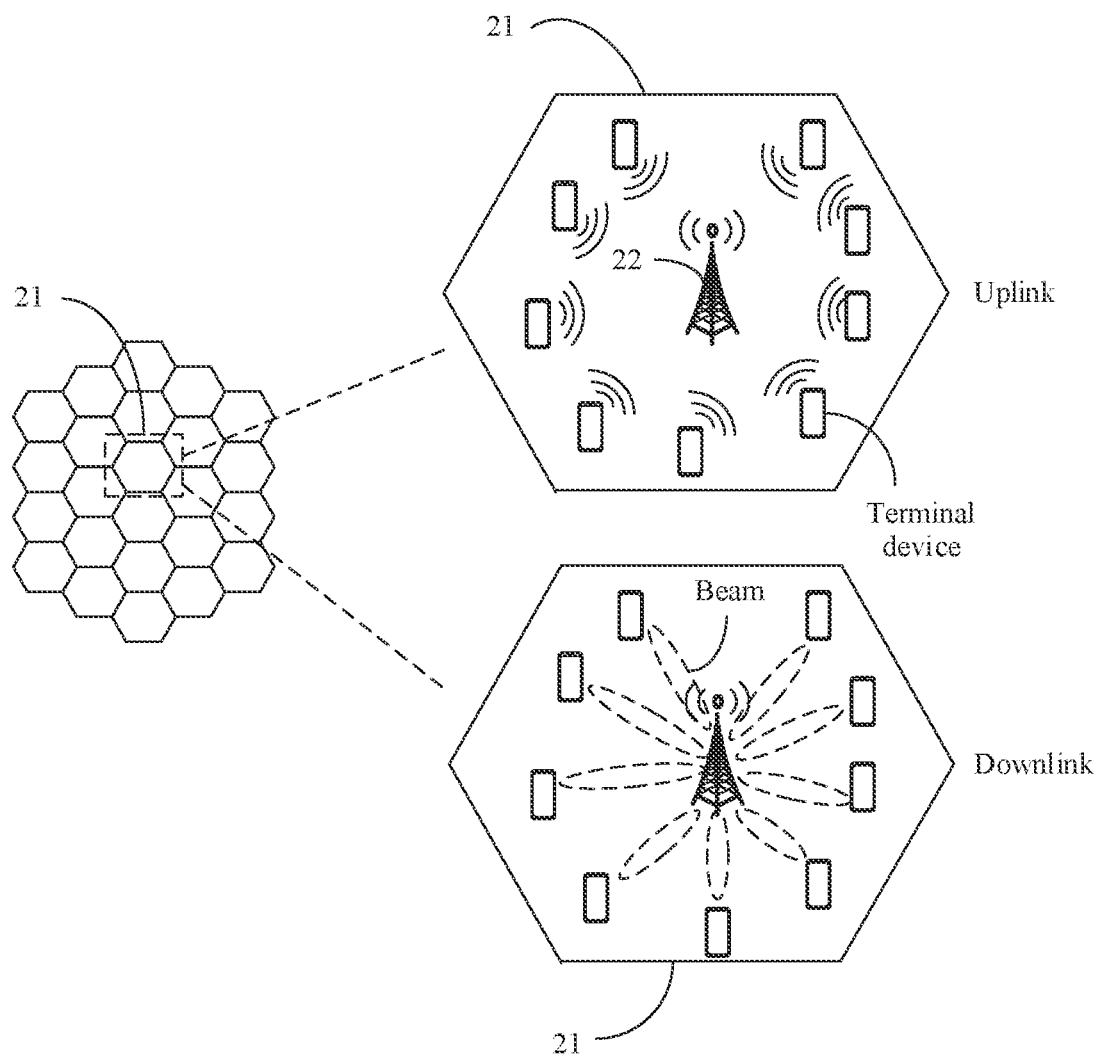
FIG. 2 is a schematic diagram of another application scenario according to an embodiment of this application.

In addition, embodiments of this application are not only applicable to communication systems such as a 4G wireless communication system, a vehicle to everything (V2X) communication system, a device-to-device (D2D) communication system, and subsequent evolution of LTE. Embodiments of this application may be further applied to a next-generation wireless communication system, and may be further applied to another system that may appear in the future, for example, a next-generation Wi-Fi network and 5G Internet of vehicles. The next-generation wireless communication system may be formed by integrating heterogeneous networks of a plurality of standards, such as LTE, 5G, and satellite networks, to form a communication network that integrates sea, land, air, and space with seamless global coverage. In the next-generation wireless communication system, a network device is usually configured with a large-scale antenna array, and the large-scale antenna array may form a plurality of beams to provide communication services for different users. The network device may be a satellite, or may be a ground base station. FIG. 2 is a schematic diagram of a large-scale beam communication system in which a ground base station is used as an example. As shown in FIG. 2, 21 represents any cell in the large-scale beam communication system. For example, FIG. 2 shows a status of sending uplink data by a terminal in the cell 21 and a status of sending downlink data by a base station 22. The base station 22 may be configured with one or more antenna arrays, to form a plurality of beams, and beams in different directions may cover terminal devices at different locations in a cell. It may be understood that, in a satellite communication system, a satellite may form more beams. For example, a single satellite may form more than 1000 beams.

Figure 3:
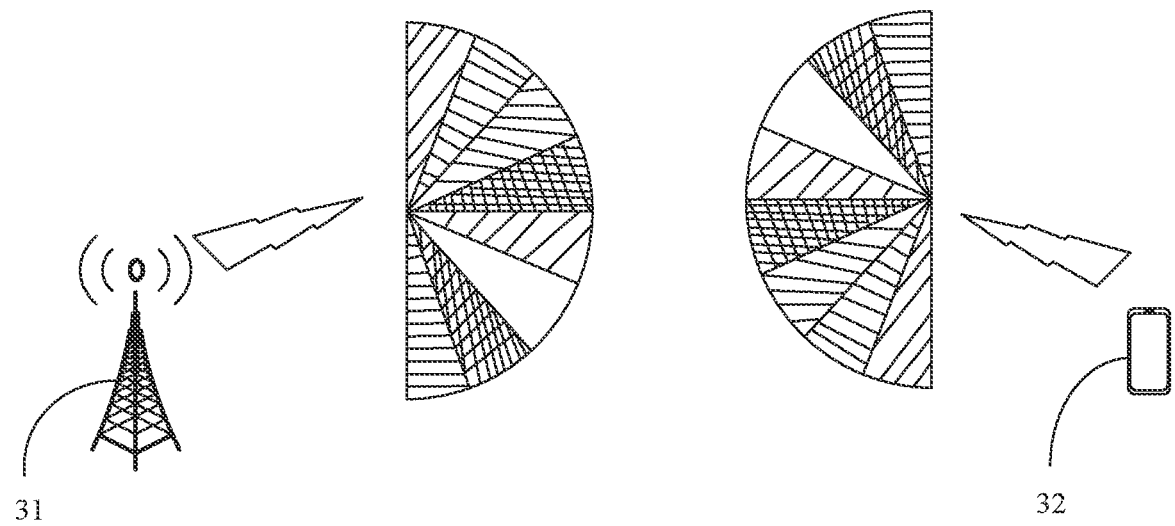
FIG. 3 is a schematic diagram of a beam according to an embodiment of this application.

When a terminal device performs initial access, the terminal device and a network device need to perform beam scanning, so that quality of a signal from the network device received by the terminal device in a beam direction is optimal. As shown in FIG. 3, an antenna array of a network device 31 forms eight beams, and an antenna array of a terminal device 32 also forms eight beams. The terminal device 32 needs to determine one beam from the eight beams, so that signal quality of a signal from the network device 31 received by the terminal device 32 on the beam is optimal. Common beam scanning methods include an exhaustive search method and a layer search method. The following separately describes the two methods.

Figure 4:
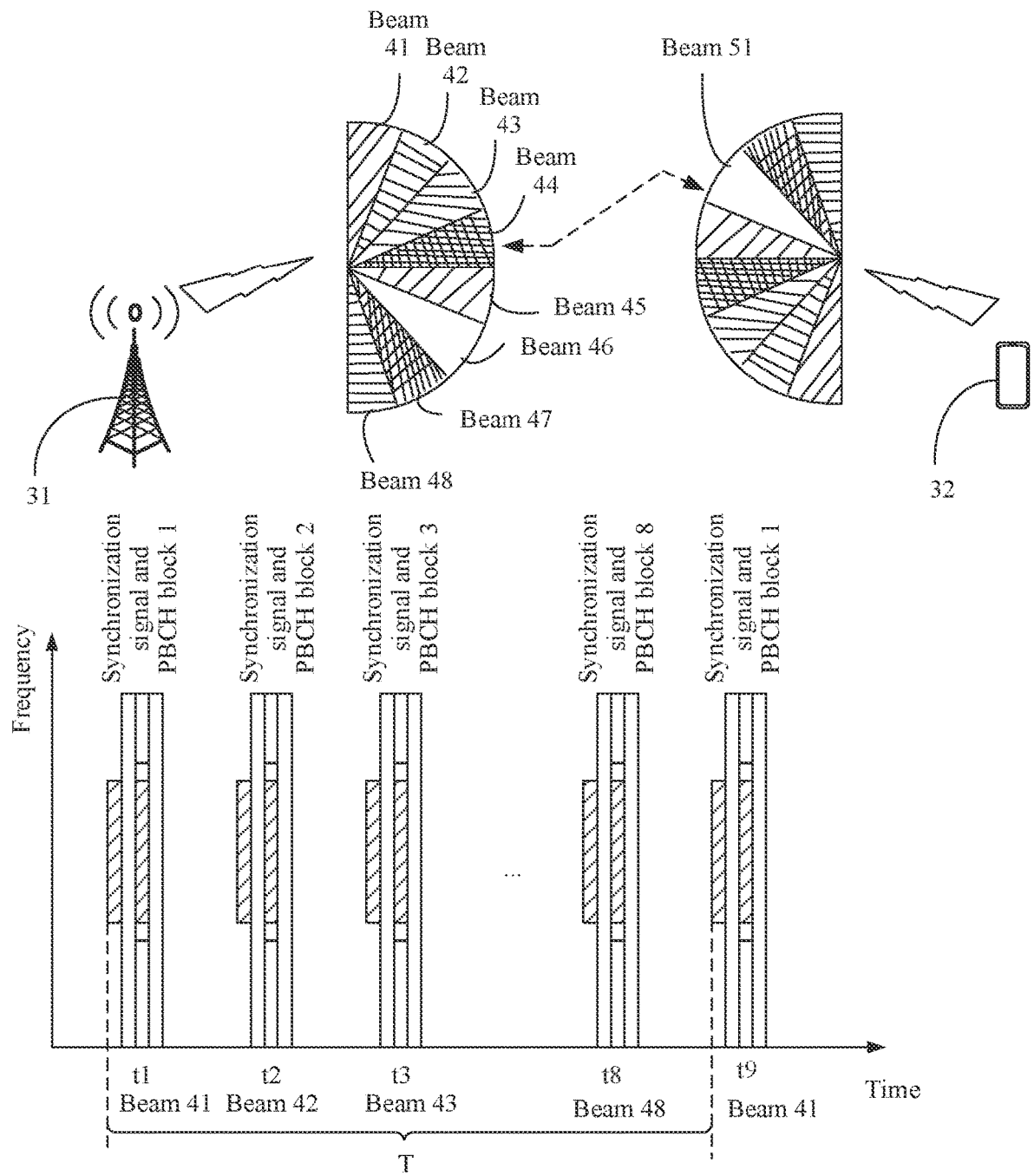
FIG. 4 is a schematic diagram of sending an SSB in time division on a beam according to an embodiment of this application.

In the exhaustive search method, the network device 31 may separately send an SSB in time division on the eight beams of the network device 31. The SSB includes a synchronization signal and broadcast information, and the synchronization signal includes a primary synchronization signal and a secondary synchronization signal. The broadcast information may include a master information block (MIB). The MIB may include identification information of the SSB, for example, an SSB index. In addition, the SSB may identify a beam. For example, an SSB index is in a one-to-one correspondence with a beam index, and different beam indexes correspond to different beams. The network device 31 sends SSBs with different identification information in time division on different beams. As shown in FIG. 4, the network device 31 may send an SSB1 on a beam 41 at a moment t1, send an SSB2 on a beam 42 at a moment t2, send an SSB3 on a beam 43 at a moment t3, and so on. In addition, the network device 31 may periodically send the SSB in time division on the eight beams of the network device 31. For example, after sending an SSB8 on a beam 48, the network device 31 may continue to send the SSB1 on the beam 41, and so on. Herein, duration in which the network device 31 sends a corresponding SSB in time division on the eight beams of the network device 31 may be denoted as a period T. In a same period T, time intervals between adjacent moments from the moment t1 to the moment t8 may be the same or different.

In a period, the terminal device 32 may select one beam from the eight beams of the terminal device 32, for example, a beam 51, and monitor, in a direction of the beam 51, an SSB sent by a network device in the period. If quality of a signal received by the terminal device 32 in the direction of the beam 51 is optimal when the network device 31 sends an SSB4 on a beam 44, the beam 44 and the beam 51 are a pair of optimal beam pairs. Further, a terminal device performs initial access based on the beam 44 and the beam 51. If the terminal device 32 fails to receive a signal in the direction of the beam 51 or quality of a received signal is poor after the network device 31 sends the corresponding SSB in time division on the eight beams of the network device 31, the terminal device 32 may select another beam, and continue to monitor, on the beam, an SSB sent by the network device, until a beam can be found, so that signal quality from the network device 31 received by the terminal device 32 on the beam is optimal. It may be understood that complexity of the exhaustive search method is high, and an initial access delay of the terminal device is large.

Figure 5:
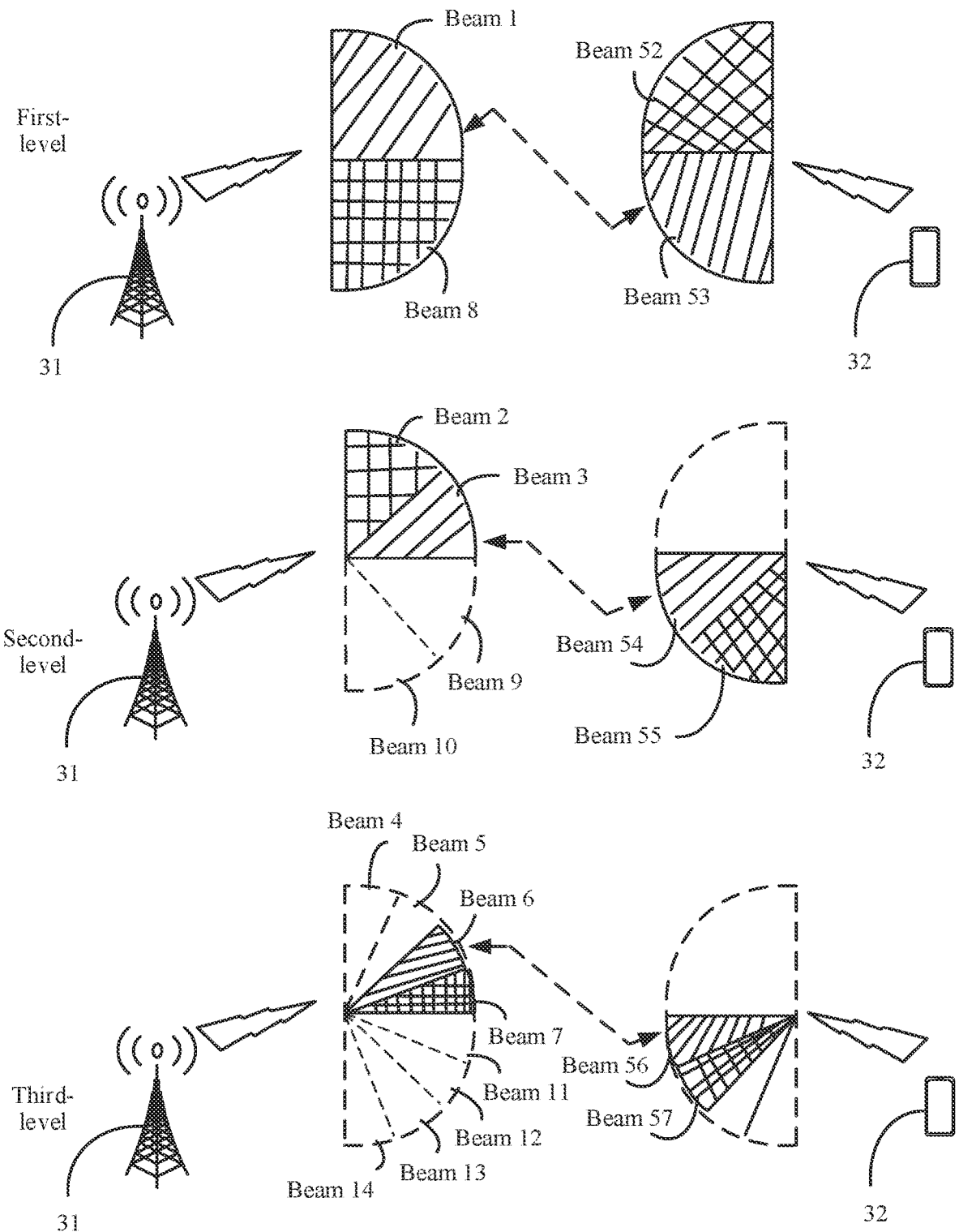
FIG. 5 is a schematic diagram of another beam according to an embodiment of this application.

In the layer search method, the network device 31 and the terminal device 32 perform beam scanning on a wide beam, and perform scanning and alignment on a narrow beam after a beam in a network device side and a beam in a terminal device side is aligned on the wide beam. As shown in FIG. 5, a beam 1 and a beam 8 may be denoted as first-level beams, a beam 2, a beam 3, a beam 9, and a beam 10 may be denoted as second-level beams, and a beam 4, a beam 5, a beam 6, a beam 7, a beam 11, a beam 12, a beam 13, and a beam 14 may be denoted as third-level beams. The first-level beam includes the second-level beam. For example, the beam 1 includes the beam 2 and the beam 3, and the beam 8 includes the beam 9 and the beam 10. The second-level beam includes the third-level beam. For example, the beam 2 includes the beam 4 and the beam 5, the beam 3 includes the beam 6 and the beam 7, the beam 9 includes the beam 11 and the beam 12, and the beam 10 includes the beam 13 and the beam 14.

Figure 6:
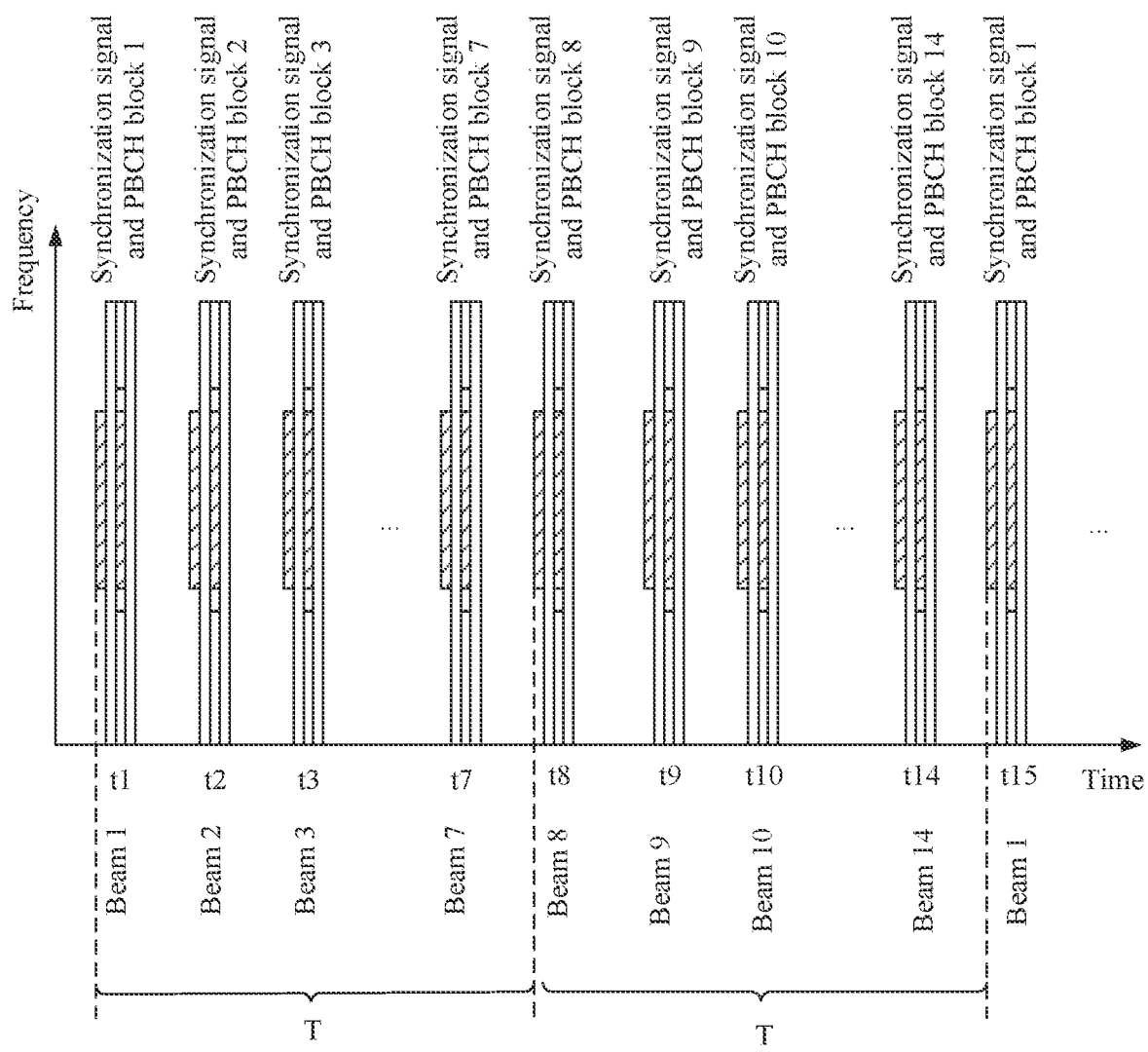
FIG. 6 is another schematic diagram of sending an SSB in time division on a beam according to an embodiment of this application.

The network device 31 may send SSBs with different identification information in time division on a first-level beam, a second-level beam included in the first-level beam, and a third-level beam included in the second-level beam. For example, the network device 31 may send the SSB1 on the beam 1 at the moment t1, send the SSB2 on the beam 2 at the moment t2, send the SSB3 on the beam 3 at the moment t3, and so on. An SSB7 is sent on the beam 7 at a moment t7. As shown in FIG. 6, the network device 31 may further send SSBs with different identifier information in time division on the beam 8, the beam 9 and the beam 10 included in the beam 8, and third-level beams respectively included in the beam 9 and the beam 10. In addition, after the network device 31 sends an SSB 14 on the beam 14 at a moment t14, the network device 31 may further continue to send the SSB 1 on the beam 1, and send a corresponding SSB on a narrow beam included in the beam 1. Herein, duration in which the network device 31 sends a corresponding SSB in time division on a first-level beam and a second-level beam and a third-level beam included in the first-level beam may be denoted as the period T.

The terminal device 32 may first determine which beam of first-level beams, for example, the beam 52 and the beam 53, of the terminal device 32 can receive a signal sent by the network device 31. If the signal sent by the network device 31 on the beam 1 can be received in a direction of the beam 53, the beam 53 and the beam 1 are a pair of optimal beam pairs.

Further, the terminal device 32 determines which one of the second-level beam 54 and the second-level beam 55 included in the beam 53 can receive the signal sent by the network device 31. If the signal sent by the network device 31 on the beam 3 can be received in a direction of the beam 54, the beam 3 and the beam 54 are a pair of optimal beam pairs.

Further, the terminal device 32 determines which one of the third-level beam 56 and the third-level beam 57 included in the beam 54 can receive the signal sent by the network device 31. If the signal sent by the network device 31 on the beam 6 can be received in a direction of the beam 56, the beam 6 and the beam 56 are a pair of optimal beam pairs. Further, a terminal device performs initial access based on the beam 6 and the beam 56. It may be understood that complexity of the layer search method is low, and an initial access delay of the terminal device is small.

However, in the exhaustive search method and the layer search method, SSBs sent by the network device in time division on different beams are the same except that identification information of the SSBs is different, and other information included in the SSBs is the same. For example, the beam 1 shown in FIG. 5 includes the beam 2 and the beam 3, that is, the beam 1 is coupled to the beam 2, and the beam 1 is coupled to the beam 3. Therefore, synchronization signals carried in the SSB1, the SSB2, and the SSB3 are the same. In addition, MIBs carried in the SSB1, the SSB2, and the SSB3 are the same except that identification information of the SSB1, the SSB2, and the SSB3 is different. In other words, the synchronization signals and the MIBs carried in the SSB1, the SSB2, and the SSB3 cause certain redundancy. As a result, resource overheads required for an SSB sent by the network device in time division are large, and a resource waste problem is caused. To resolve this problem, embodiments of this application provide an information transmission method. The method may be applicable to the foregoing layer search method. The following describes the information transmission method in detail with reference to embodiments.

Figure 7:
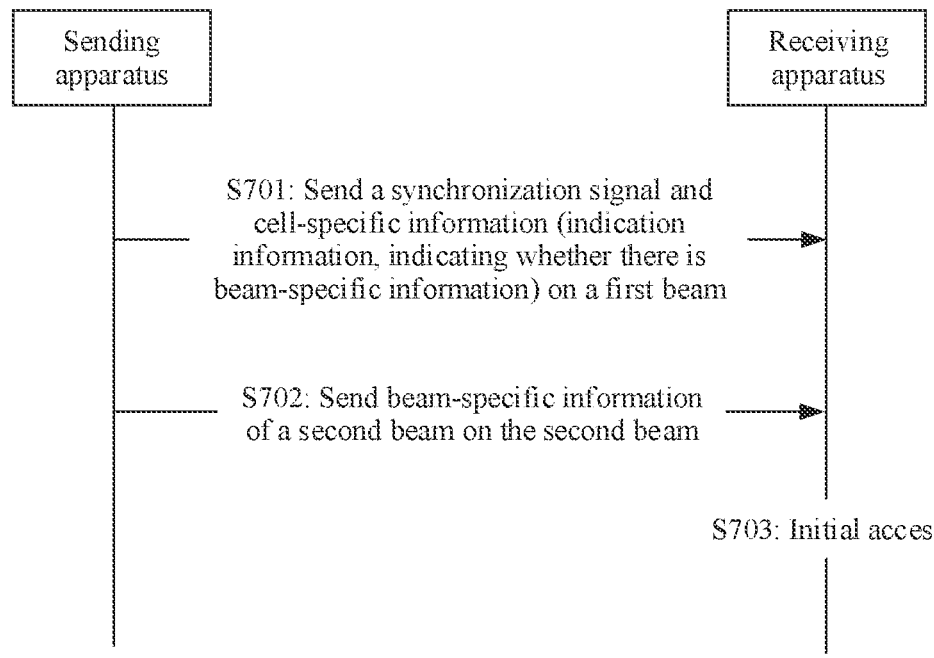
FIG. 7 is a flowchart of an information transmission method according to an embodiment of this application.

FIG. 7 is a flowchart of an information transmission method according to an embodiment of this application. The method may be applicable to a communication system shown in FIG. 8. As shown in FIG. 7, the information transmission method in this embodiment includes the following steps.

S701: A sending apparatus sends and a receiving apparatus receives a synchronization signal and cell-specific information on a first beam, where the cell-specific information includes indication information, and the indication information indicates whether there is beam-specific information.

In this embodiment, the receiving apparatus may be a terminal device or a chip. The sending apparatus may be a network device. The network device may be a satellite, or may be a ground base station. The first beam is a wide beam, and a second beam is a narrow beam. The first beam includes a plurality of second beams.

Figure 8:
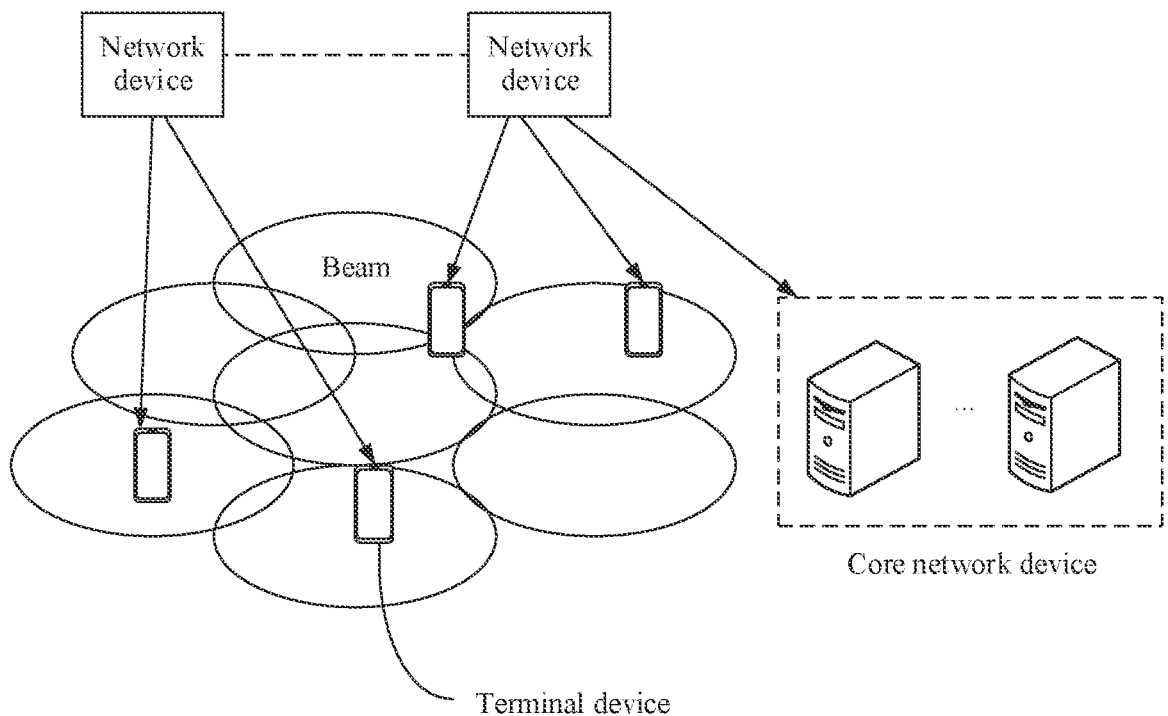
FIG. 8 is a schematic diagram of still another application scenario according to an embodiment of this application.

For example, the receiving apparatus is a terminal device shown in FIG. 8, and the sending apparatus is a network device shown in FIG. 8. For example, the network device may be a satellite, and coverage of one or more beams of the satellite may be one cell. The network device may not only provide communication service for a terminal device in the cell, but also communicate with a core network device.

Figure 9:
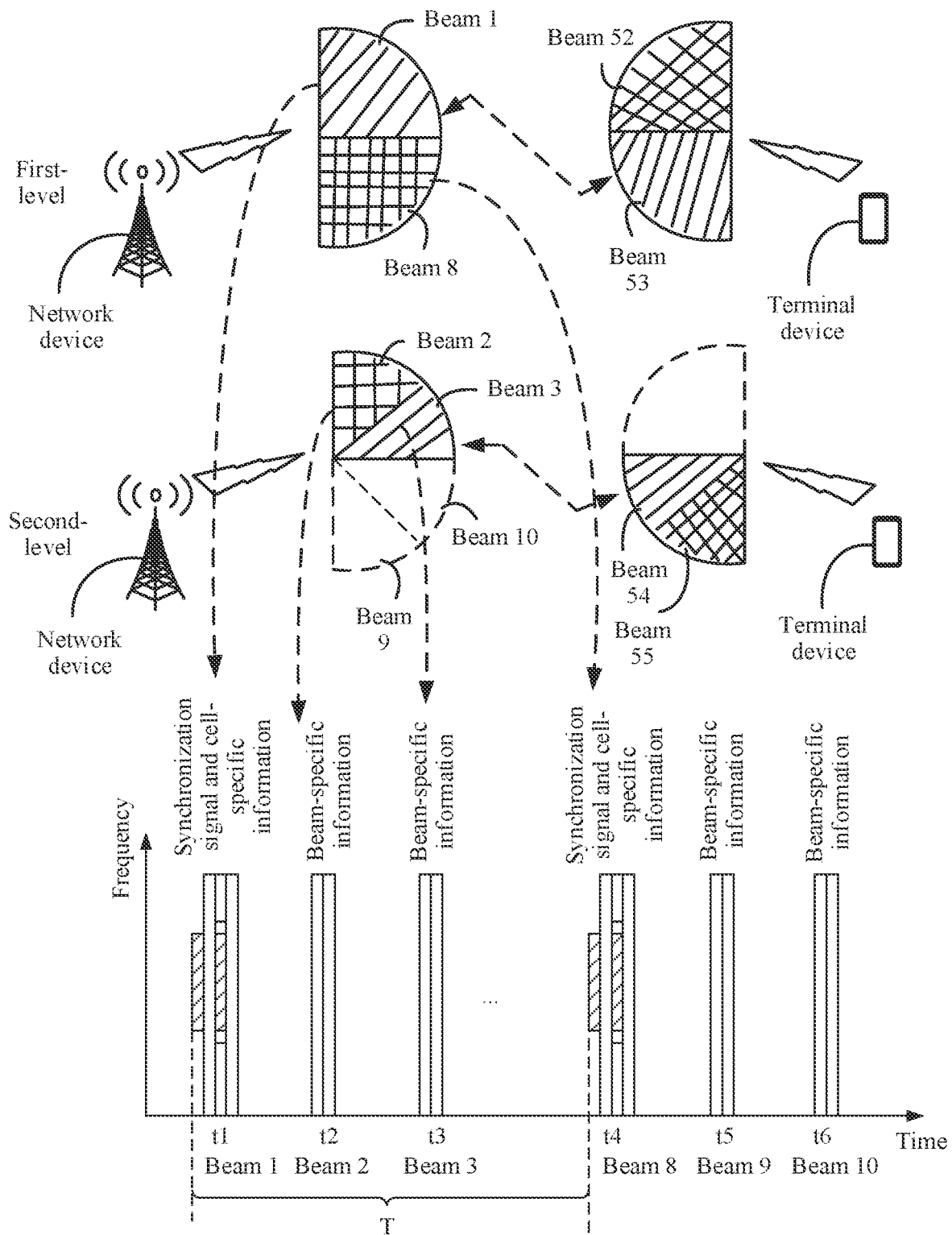
FIG. 9 is a schematic diagram of another information transmission method according to an embodiment of this application.

As shown in FIG. 9, beams of the network device and the terminal device may be classified into two levels of beams. For example, a beam 1, a beam 8, a beam 52, and a beam 53 are first-level beams, and a beam 2, a beam 3, a beam 9, a beam 10, a beam 54, and a beam 55 are second-level beams. The first-level beam is a wide beam, and the second-level beam is a narrow beam. The wide beam may be denoted as the first beam, and the narrow beam may be denoted as the second beam. A wide beam includes a plurality of narrow beams.

The network device may send the synchronization signal and the cell-specific information on the first beam, for example, the beam 1. A time-frequency resource of the first beam is not limited in this embodiment of this application. The synchronization signal includes a primary synchronization signal and a secondary synchronization signal. The cell-specific information may be broadcast information (BI). A function of the cell-specific information is the same as a function of an SSB. A signaling structure of the cell-specific information may be the same as a signaling structure of an MIB, but is not limited to the signaling structure of the MIB, or may be another signaling structure. In this embodiment of this application, the cell-specific information includes the indication information, and the indication information indicates whether there is the beam-specific information. For example, a bit is newly added to the cell-specific information. When a value of the bit is 1, it indicates that there is the beam-specific information. When the value of the bit is 0, it indicates that there is no beam-specific information.

S702: If the indication information indicates that there is the beam-specific information, the sending apparatus sends and the receiving apparatus receives beam-specific information that is of the second beam on the second beam.

If the indication information in the cell-specific information indicates that there is the beam-specific information, as shown in FIG. 9, the network device sends the beam-specific information in time division on the second beam, for example, the beam 2 and the beam 3 included in the beam 1. Beam-specific information sent by the network device on the beam 2 is beam-specific information of the beam 2, and beam-specific information sent by the network device on the beam 3 is beam-specific information of the beam 3. A time-frequency resource of the second beam is not limited in this embodiment of this application.

The beam-specific information may also be broadcast information. To distinguish the cell-specific information from the beam-specific information, the cell-specific information may be denoted as BI-0, and the beam-specific information may be denoted as BI-1. The cell-specific information is information broadcast by the network device at a cell level, and the beam-specific information is information broadcast by the network device at a beam level. To be specific, the terminal device in the cell may receive the cell-specific information. The beam-specific information may be received by a terminal device within coverage of a beam. As shown in FIG. 9, assuming that coverage of the beam 1 and the beam 8 is a cell, the network device may broadcast cell-specific information in time division on the beam 1 and the beam 8, so that each terminal device in the cell can receive the cell-specific information. When the network device broadcasts the beam-specific information of the beam 2 on the beam 2, a terminal device in coverage of the beam 2 may receive the beam-specific information of the beam 2.

Figure 10:
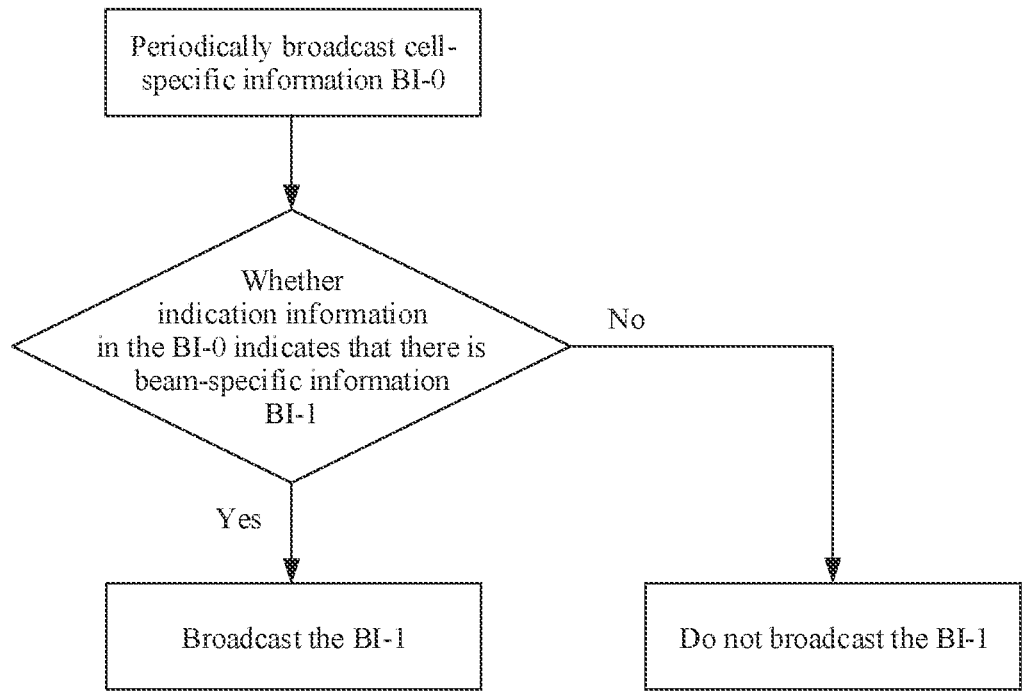
FIG. 10 is a schematic diagram of still another information transmission method according to an embodiment of this application.

In addition, the network device may periodically broadcast the cell-specific information BI-0. If the indication information in the BI-0 indicates that there is the beam-specific information, after the network device broadcasts the cell-specific information BI-0 on the wide beam, the network device continues to broadcast the beam-specific information BI-1 of any narrow beam on the narrow beam included in the wide beam. Logic herein is shown in FIG. 10. As shown in FIG. 9, the network device broadcasts the synchronization signal and the cell-specific information BI-0 on the beam 1 at a moment t1, where the indication information in the BI-0 indicates that there is the beam-specific information. Further, the network device broadcasts the beam-specific information BI-1 of the beam 2 on the beam 2 at a moment t2, and broadcasts the beam-specific information BI-1 of the beam 3 on the beam 3 at a moment t3. After the moment t3, the network device may continue to send the synchronization signal and the cell-specific information on the beam 8, and send the beam-specific information in time division on a second-level beam included in the beam 8. Duration in which the network device sends a corresponding SSB in time division on a first-level beam and a second-level beam included in the first-level beam is denoted as a period T.

S703: The receiving apparatus performs initial access.

Figure 11:
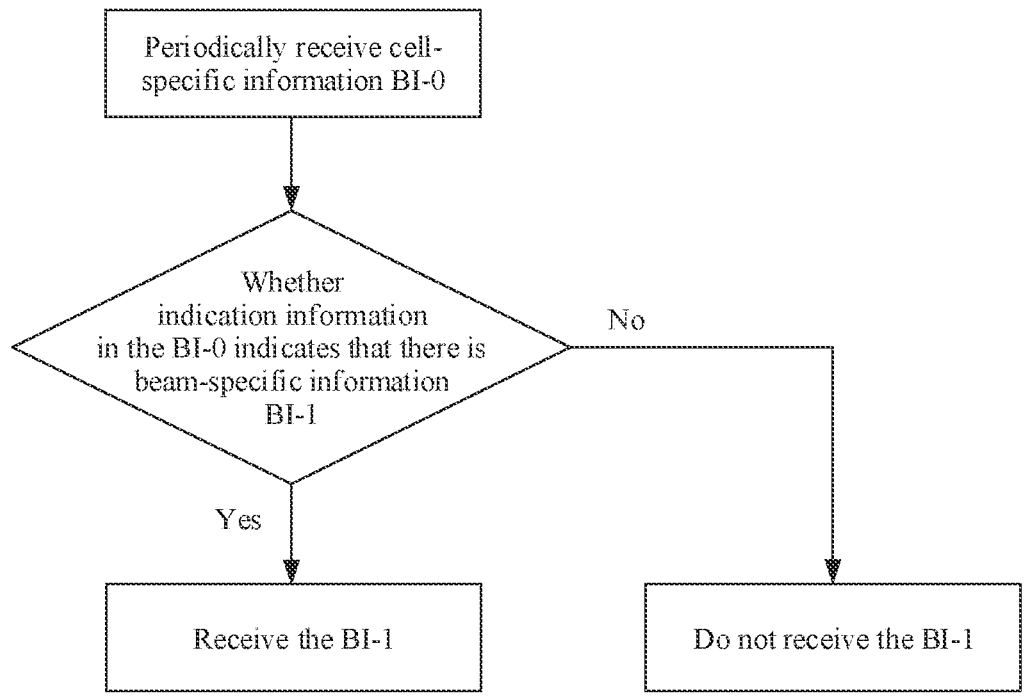
FIG. 11 is a schematic diagram of yet another information transmission method according to an embodiment of this application.

For example, if the terminal device is within coverage of the beam 3, the terminal device may periodically receive the cell-specific information BI-0, and determine whether there is the beam-specific information based on indication information in the BI-0. If the indication information indicates that there is the beam-specific information, the terminal device continues to receive the beam-specific information BI-1. Logic herein is shown in FIG. 11. For example, the terminal device may first determine which beam of the first-level beams, for example, the beam 52 and the beam 53, of the terminal device can receive the synchronization signal and the cell-specific information, or which beam of the beam 52 and the beam 53 receives a signal of optimal quality. If the synchronization signal and the cell-specific information can be received in a direction of the beam 53, or signal quality received in the direction of the beam 53 is optimal, the terminal device further determines a second-level beam, for example, which beam of the beam 54 and the beam 55 can receive the beam-specific information of the beam 3, or which beam of the beam 54 and the beam 55 receives a signal of optimal quality. If the beam-specific information of the beam 3 can be received in a direction of the beam 54, or quality of a signal received in a direction of the beam 54 is optimal, the terminal device may perform initial access through the beam 54 and the beam 3.

In this embodiment, the sending apparatus sends the synchronization signal and the cell-specific information on the first beam. When the indication information included in the cell-specific information indicates that there is the beam-specific information, the sending apparatus sends beam-specific information of any second beam included in the first beam on the second beam. Because the beam-specific information does not include the synchronization information or the MIB, and the beam-specific information may identify the second beam, redundancy of information sent by the sending apparatus in time division on the first beam and a plurality of second beams included in the first beam is greatly reduced, thereby reducing resource overheads of broadcasting signaling by the sending apparatus.

Figure 12:
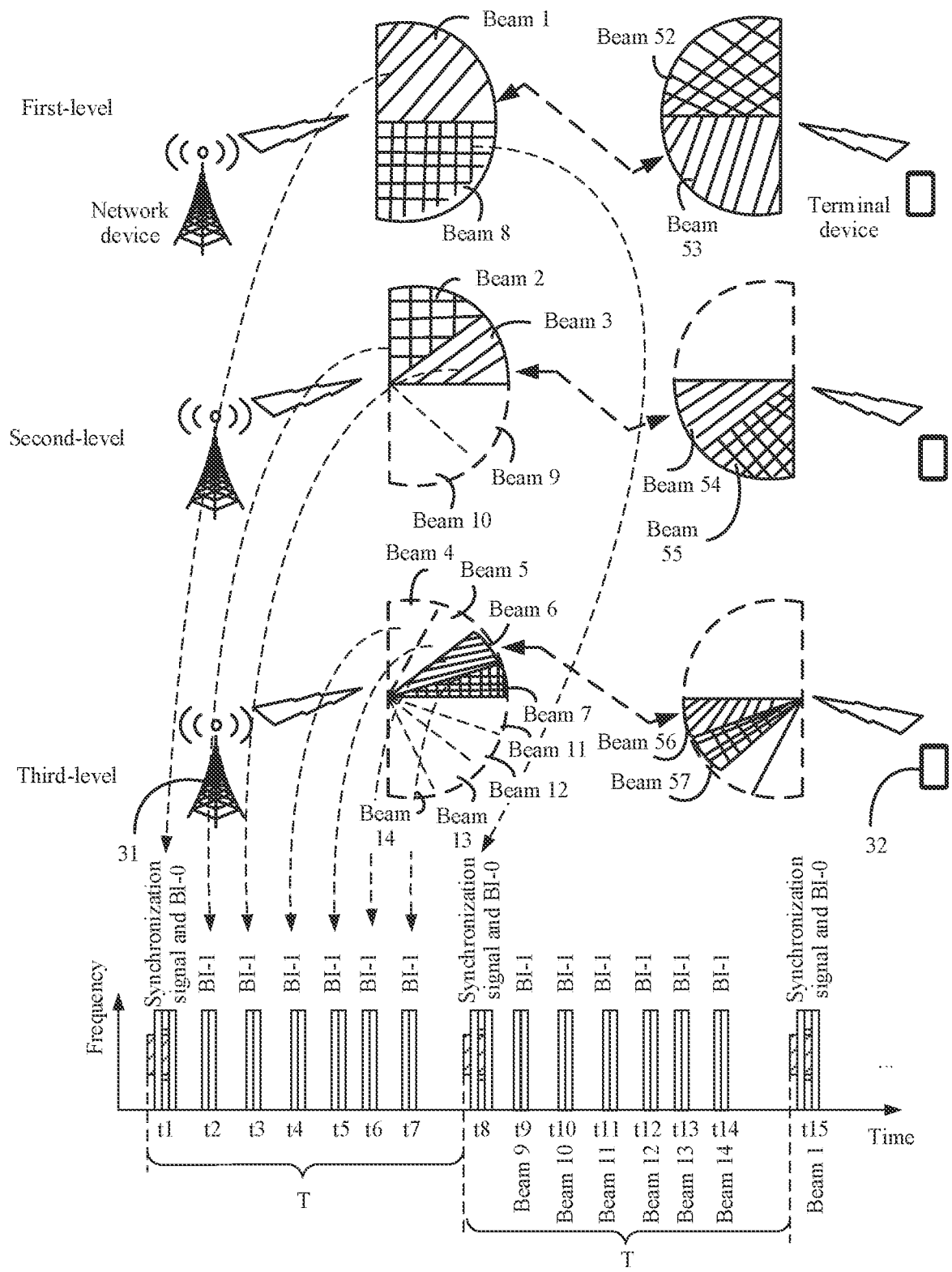
FIG. 12 is a schematic diagram of still yet another information transmission method according to an embodiment of this application.

Based on the foregoing embodiments, beams of a network device and a terminal device may be further classified into three levels of beams. As shown in FIG. 12, a beam 1 and a beam 8 may be denoted as first-level beams, a beam 2, a beam 3, a beam 9, and a beam 10 may be denoted as second-level beams, and a beam 4, a beam 1, a beam 5, a beam 6, a beam 7, a beam 11, a beam 12, a beam 13, and a beam 14 may be denoted as third-level beams. The first-level beam may be denoted as the first beam, and the second-level beam and the third-level beam may be denoted as the second beam. The network device may send the synchronization signal and the BI-0 on the beam 1 at the moment t1, and send the BI-1 in time division on the second-level beam and the third-level beam included in the beam 1. In addition, after sending the corresponding BI-1 on the third-level beam included in the beam 1, the network device may send the synchronization signal and the BI-0 on the beam 8 at a moment t8, and send the BI-1 in time division on the second-level beam and the third-level beam included in the beam 8.

In a first phase, the network device and the terminal device perform preliminary beam alignment based on the first-level beam. For example, the beam 1 and the beam 53 are aligned. The terminal device demodulates the synchronization signal and the cell-specific information that are sent by the network device on the first-level beam, and determines whether there is the beam-specific information based on the indication information included in the cell-specific information. If there is the beam-specific information, the network device and the terminal device perform precise beam alignment based on the second-level beam in a second phase. For example, the beam 3 and the beam 54 are aligned. In a third phase, the network device and the terminal device perform more precise alignment based on the third-level beam. For example, the beam 6 and the beam 56 are aligned.

In embodiments of this application, the beam-specific information BI-1 may include at least one of a space identifier (Beam-space-index), a frequency identifier (Beam-freq-index), a time identifier (Beam-time-index), and a beam-characteristic identifier, a DMRS position identifier (physical uplink shared channel (PDSCH) DMRS position), and check information (Cyclic Redundancy Check, CRC). The beam-characteristic identifier identifies at least one of a shape, an opening angle, a timing advance, a polarization manner, or a beam level. The beam level indicates a level of the beam. The space identifier may occupy N1 bits, the time identifier may occupy N2 bits, the frequency identifier may occupy N3 bits, the beam-characteristic identifier may occupy M bits, the DMRS position identifier may occupy 1 bit, and the check information may occupy K bits.

Figure 13:
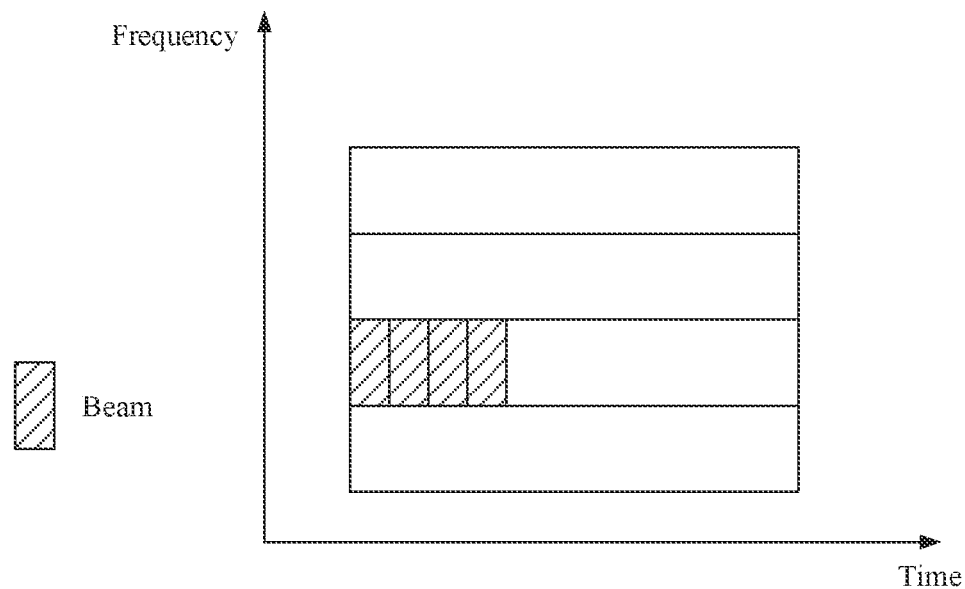
FIG. 13 is a schematic diagram of a beam according to an embodiment of this application.

If the network device broadcasts the BI-1 on a second beam, the BI-1 may include at least one of a space identifier, a frequency identifier, a time identifier, a beam-characteristic identifier, a DMRS position identifier, and check information of the second beam. The beam-characteristic identifier identifies at least one of a shape, an opening angle, a timing advance, a polarization manner, or a beam level of the second beam. The beam level indicates a level or a class of the beam, to adapt to beam scanning w % ben there area plurality of layers (for example, a quantity of layers is greater than or equal to 2). For example, the beam 2 is a second-level beam, and the BI-1 sent by the network device on the beam 2 may include at least one of a space identifier, a frequency identifier, a time identifier, a beam-characteristic identifier, a DMRS position identifier, and check information of the beam 2. The beam-characteristic identifier identifies at least one of a shape, an opening angle, a timing advance, a polanzation manner, or a beam level (for example, a second-level beam) of the beam 2. Based on the foregoing embodiments, different beams may operate on a same frequency. As shown in FIG. 13, four different beams operate on a same frequency. In this case, the beams may be distinguished through time identifiers (Beam-time-index) of the beams.

Figure 14:
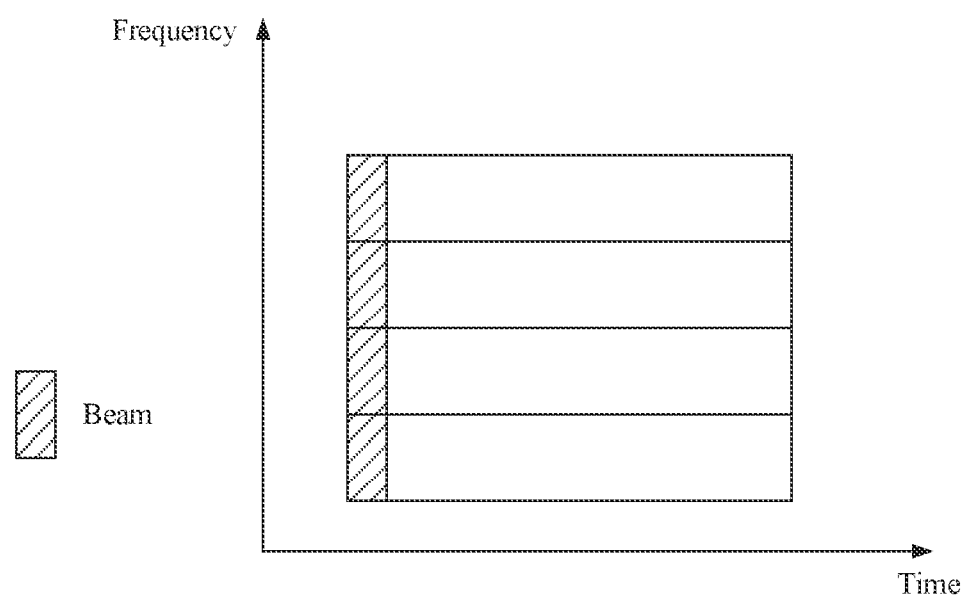
FIG. 14 is a schematic diagram of another beam according to an embodiment of this application.

However, in some scenarios, for example, in a satellite communication system, different beams may also operate on different frequencies. As shown in FIG. 14, beams may not be distinguished based on only time identifiers (Beam-time-index) of the beams. In this case, the beams may be distinguished based on time identifiers (Beam-time-index) and frequency identifiers (Beam-freq-index) of the beams. For example, a beam index=f (time identifier, frequency identifier), where f is a function of the time identifier and the frequency identifier, and a form of f is not limited herein.

In some other scenarios, there may be beams in different spaces at the same time and on a same frequency. In this case, different beams may be identified based on time identifiers (Beam-time-index) and space identifier (Beam-space-index) in the beam-specific information. For example, a beam index=f (time identifier, space identifier), where f is a function of the time identifier and the space identifier, and a form of f is not limited herein. For example, the beam index=M*Beam-time-index+Beam-space-index, or the beam index=Beam-time-index+N*Beam-space-index, or the beam index=[Beam-space-index, Beam-time-index]. To be specific, the Beam-space-index is a high bit, and the Beam-time-index is a low bit.

Figure 15:
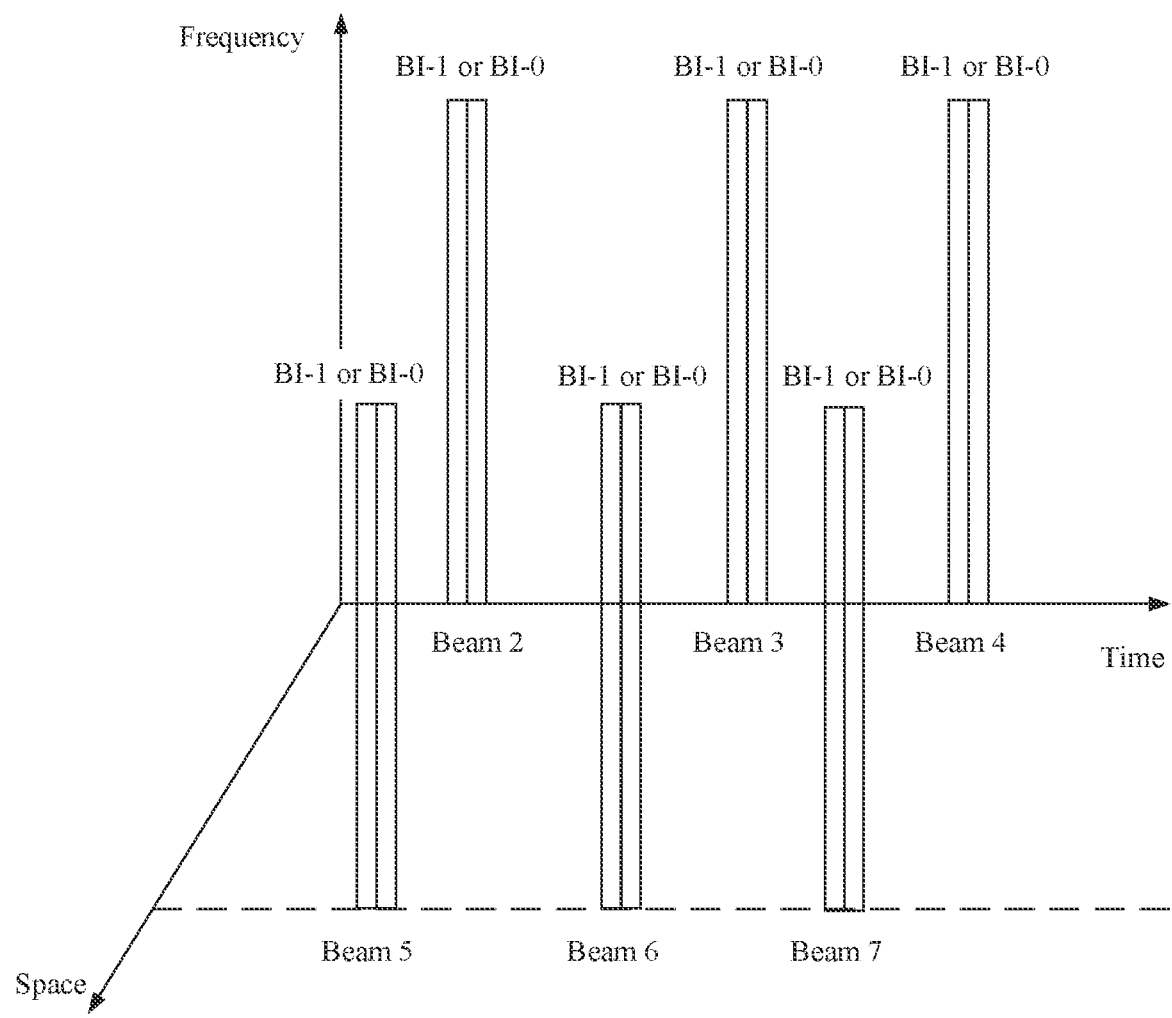
FIG. 15 is a schematic diagram of still another beam according to an embodiment of this application.

In some other scenarios, different beams may be further identified based on a time identifier (Beam-time-index), a frequency identifier (Beam-freq-index), and a space identifier (Beam-space-index) in the beam-specific information. As shown in FIG. 15, there may be two beams in different spaces at the same time and on a same frequency, for example, the beam 2 and the beam 5. In this case, the beam index=f (time identifier, space identifier, and frequency identifier), where f is a function of the time identifier, the space identifier, and the frequency identifier.

It may be understood that the cell-specific information may also include at least one of a time identifier (Beam-time-index), a frequency identifier (Beam-freq-index), and a space identifier (Beam-space-index) of the first beam. In addition, a beam index of the first beam may be determined based on at least one of the time identifier, the frequency identifier, or the space identifier of the first beam. Alternatively, the cell-specific information may include the beam index of the first beam. Likewise, the beam-specific information may include a beam index of the second beam.

In this embodiment, a beam index of a beam is determined through at least one of a space identifier or a frequency identifier of the beam and a time identifier of the beam, so that a plurality of beams that exist at the same time, on a same frequency, and in different spaces may be distinguished. This implements a beam identification method of a next-generation larger-scale beam communication system, and improves beam identification precision.

Figure 16:
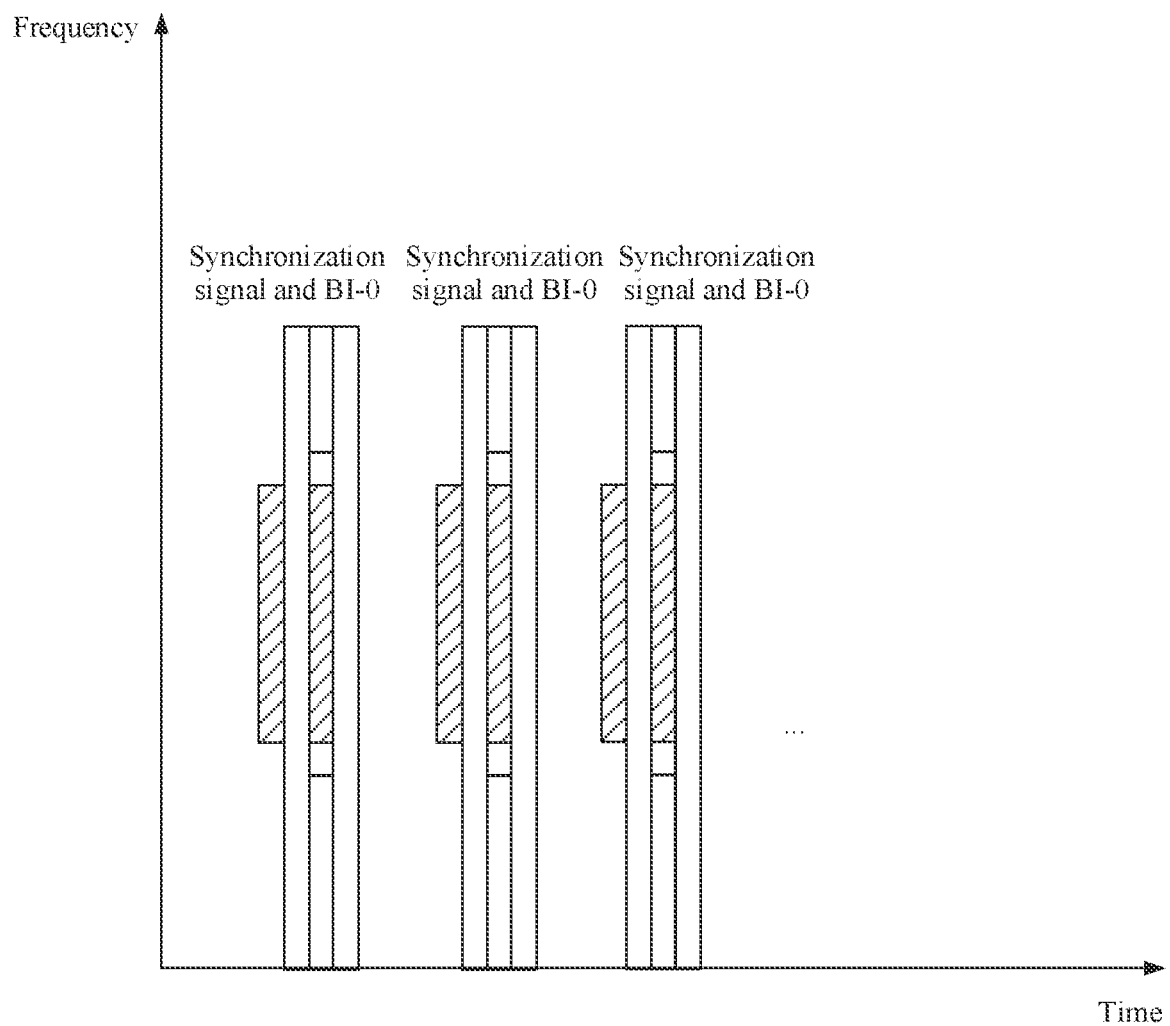
FIG. 16 is a schematic diagram of synchronization information and BI-0 according to an embodiment of this application.

In addition, it may be understood that, in the foregoing embodiments, if the cell-specific information BI-0 reuses a MIB format in an NR system, when the indication information in the cell-specific information BI-0 indicates that there is no beam-specific information, a synchronization signal broadcast by the network device on a wide beam and the BI-0 are equivalent to an SSB in the NR system. Therefore, the information transmission method provided in this application may be compatible with an SSB configuration method in an NR protocol, as shown in FIG. 16.

For a terminal device, a beam alignment delay may be further reduced based on a space identifier (Beam-space-index). The space identifier is in a one-to-one correspondence with a space location of a beam. The space location of the beam may include an angle of the beam relative to a network device and/or location information of a center point of the beam. When the terminal device receives the beam-specific information of the second beam, and the beam-specific information includes the space identifier of the second beam, the terminal device may determine a space location of the second beam based on the space identifier of the second beam, and further adjust a beam direction of the terminal device based on the space location of the second beam and location information of the terminal device, so that a beam of the terminal device and the second beam of the network device are aligned. The location information of the terminal device may be positioning information of the terminal device obtained by a positioning module in the terminal device.

For example, as shown in FIG. 10, the network device broadcasts the beam-specific information of the beam 3 on the beam 3, and the beam-specific information includes a space identifier of the beam 3. When the terminal device receives the beam-specific information of the beam 3 that is broadcast by the network device on the beam 3, the terminal device may demodulate a space identifier of the beam 3 from the beam-specific information, and determine a space location of the beam 3 based on the space identifier of the beam 3. Further, the terminal device adjusts a direction of the beam 54 based on the space location of the beam 3 and the location information of the terminal device, so that the beam 3 and the beam 54 are aligned. In this way, not only a delay of beam alignment of the terminal device can be reduced, but also beam alignment accuracy can be improved.

Figure 17:
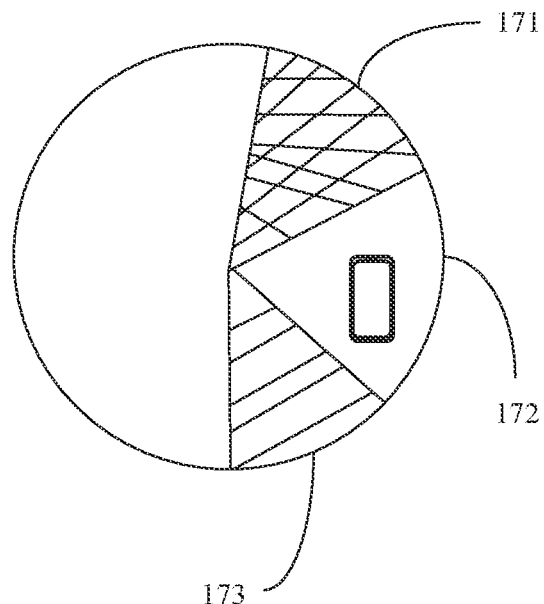
FIG. 17 is a schematic diagram of a location of a terminal device according to an embodiment of this application.

As shown in FIG. 17, a beam 171, a beam 172, and a beam 173 are beams of the network device. A space identifier of the beam 171=1, a space identifier of the beam 172=2, and a space identifier of the beam 173=3. A space identifier of a beam is in a one-to-one correspondence with a space location of the beam. The terminal device is located within coverage of the beam 172. After the terminal device performs initial access within the coverage of the beam 172, if the terminal device needs to perform beam switching, the terminal device may determine a space location of a beam on which the terminal device is currently located based on a space identifier, for example, 2, of the beam on which the terminal device is currently located. The terminal device may determine, based on space identifiers of two beams, whether the two beams are adjacent in space. For example, two beams of adjacent space identifiers are adjacent to each other in space. When the terminal device determines that the space identifier of the beam on which the terminal device is currently located is 2, the terminal device may determine that a beam with a space identifier 1 and a beam with a space identifier 3 are adjacent beams of the beam on which the terminal device is currently located. Further, the adjacent beams of the beam are measured based on the space location of the beam in which the terminal device is currently located. In other words, the terminal device only needs to measure the beam with the space identifier 1 and the beam with the space identifier 3. This reduces measurement overheads of the terminal device during beam switching, and energy consumption of the terminal device.

It may be understood that some or all of the steps or operations in the foregoing embodiments are merely examples. Other operations or variations of various operations may be further performed in this embodiment of this application. In addition, the steps may be performed in sequences different from the sequences presented in the foregoing embodiments, and not all operations in the foregoing embodiments are necessarily to be performed.

It may be understood that, in the foregoing embodiments, operations or steps implemented by the receiving apparatus such as the terminal device may also be implemented by a component (for example, a chip or a circuit) that may be used for the terminal device, and operations or steps implemented by the sending apparatus such as the network device may also be implemented by a component (for example, a chip or a circuit) that may be used in the network device.

Figure 18:
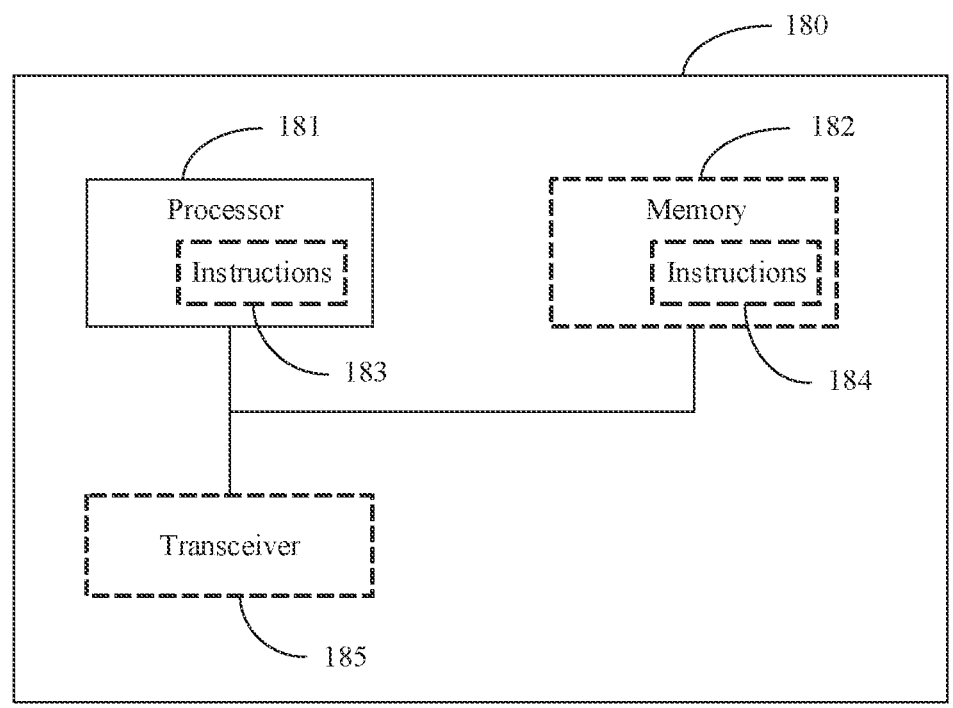
FIG. 18 is a schematic diagram depicting a structure of a communication apparatus according to an embodiment of this application.

FIG. 18 is a schematic diagram of a structure of a communication apparatus. The communication apparatus may be configured to implement the method corresponding to the network device or the terminal device described in the foregoing method embodiments. For details, refer to the description in the foregoing method embodiments.

A communication apparatus 180 may include one or more processors 181. The processor 181 may also be referred to as a processing unit, and may implement a specific control function. The processor 181 may be a general-purpose processor, a special-purpose processor, or the like.

In an optional design, the processor 181 may also store instructions 183, and the instructions may be run by the processor, so that the communication apparatus 180 performs the method, in the foregoing method embodiments, corresponding to the terminal device or the network device.

In another possible design, the communication apparatus 180 may include a circuit. The circuit may implement a sending, receiving, or communication function in the foregoing method embodiments.

Optionally, the communication apparatus 180 may include one or more memories 182. The memory stores instructions 184 or intermediate data. The instructions 184 may be run on the processor, so that the communication apparatus 180 performs the method in the foregoing method embodiments. Optionally, the memory may further store other related data. Optionally, the processor may also store instructions and/or data. The processor and the memory may be separately disposed, or may be integrated together.

Optionally, the communication apparatus 180 may further include a transceiver 185.

The processor 181 may be referred to as a processing unit. The transceiver 185 may be referred to as a transceiver unit, a transceiver machine, a transceiver circuit, a transceiver, or the like, and is configured to implement a transceiver function of the communication apparatus.

The communication apparatus is configured to implement an operation corresponding to the sending apparatus in the embodiment shown in FIG. 7. For example, the transceiver may send the synchronization signal and the cell-specific information on the first beam, and send the beam-specific information of the second beam on the second beam. The transceiver may further complete another corresponding communication function. The processor is configured to complete a corresponding determining or control operation, and optionally, may further store corresponding instructions in the memory. For specific processing manners of components, refer to related description in the foregoing embodiment.

The communication apparatus is configured to implement an operation corresponding to the receiving apparatus in FIG. 7. For example, the transceiver may receive the synchronization signal and the cell-specific information that are sent by the sending apparatus on the first beam, and receive the beam-specific information of the second beam sent by the sending apparatus on the second beam. The transceiver may further complete another corresponding communication function. The processor is configured to complete a corresponding determining or control operation, and optionally, may further store corresponding instructions in the memory. For specific processing manners of components, refer to related description in the foregoing embodiment.

The processor and the transceiver that are described in this application may be implemented on an integrated circuit (IC), an analog IC, a radio frequency integrated circuit (RFIC), a hybrid signal IC, an application-specific integrated circuit (ASIC), a printed circuit board (PCB), an electronic device, or the like. The processor and the transceiver may also be manufactured by using various IC technologies, for example, a complementary metal oxide semiconductor (CMOS), an N-channel metal oxide semiconductor (NMOS), a Positive-channel metal oxide semiconductor (PMOS), a bipolar junction transistor (BJT), a bipolar CMOS (BiCMOS), silicon germanium (SiGe), and gallium arsenide (GaAs).

Optionally, the communication apparatus may be an independent device or may be a part of a large device. For example, the device may be:

(1) an independent integrated circuit IC, a chip, or a chip system or subsystem;
(2) a set having one or more ICs, where optionally, the IC set may also include a storage component configured to store data and/or instructions;
(3) an ASIC, for example, a modem (MSM);
(4) a module that can be embedded in another device;
(5) a receiver, a terminal device, a cellular phone, a wireless device, a handheld phone, a mobile unit, or a network device; or
(6) others, or the like.

Figure 19:
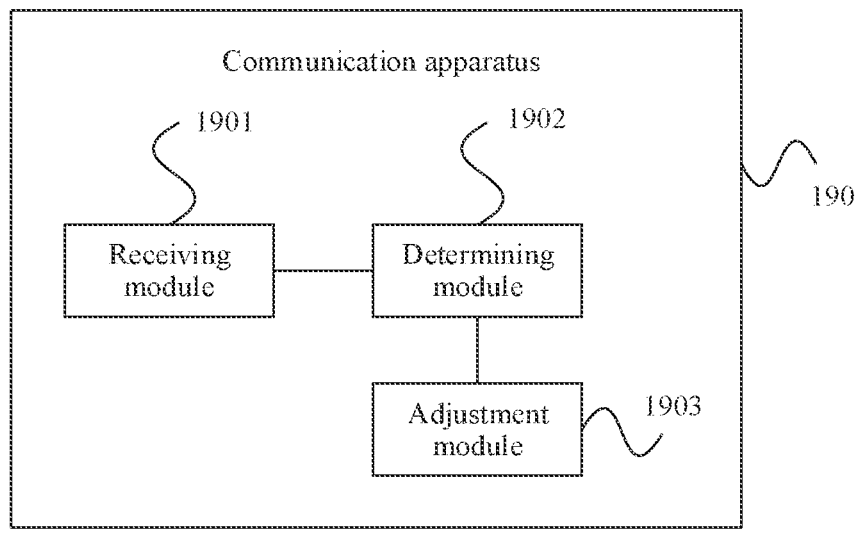
FIG. 19 is a schematic diagram depicting a structure of a communication apparatus according to an embodiment of this application.

FIG. 19 is a schematic diagram depicting a structure of a communication apparatus according to an embodiment of this application. As shown in FIG. 19, a communication apparatus 190 includes a receiving module 1901 and a determining module 1902. The receiving module 1901 is configured to receive a synchronization signal and cell-specific information sent by a sending apparatus on a first beam, where the cell-specific information includes indication information, and the indication information indicates whether there is beam-specific information; the determining module 1902 is configured to determine whether there is the beam-specific information based on the indication information; if the indication information indicates that there is the beam-specific information, the receiving module 1901 is further configured to receive beam-specific information of a second beam sent by the sending apparatus on the second beam; and the synchronization signal, the cell-specific information, and the beam-specific information are used by the communication apparatus to perform initial access, the first beam includes a plurality of second beams, and the communication apparatus is within coverage of the second beam.

In FIG. 19, the beam-specific information of the second beam further includes at least one of the following, a space identifier, a frequency identifier, a time identifier, a beam-characteristic identifier, a DMRS position identifier, and check information of the second beam.

Optionally, the beam-characteristic identifier identifies at least one of a shape, an opening angle, a timing advance, a polarization manner, or a beam level of the second beam, and the beam level indicates a level of the beam.

Optionally, a beam identifier of the second beam includes the time identifier, and at least one of the space identifier and the frequency identifier.

Optionally, the synchronization signal includes at least one of a primary synchronization signal and a secondary synchronization signal.

Optionally, the cell-specific information includes an MIB.

Optionally, the cell-specific information is periodic broadcast information.

Optionally, the determining module 1902 is further configured to determine location information of the second beam based on the space identifier of the second beam. The communication apparatus 190 further includes an adjustment module 1903, where the adjustment module 1903 is configured to adjust a beam direction of the communication apparatus based on the location information of the second beam and location information of the communication apparatus.

The communication apparatus in the embodiment shown in FIG. 19 may be configured to perform the technical solution in the foregoing method embodiments. For an implementation principle and a technical effect of the communication apparatus, further refer to related description in the method embodiments. Optionally, the communication apparatus may be a terminal device, or may be a component (for example, a chip or a circuit) of the terminal device.

Figure 20:
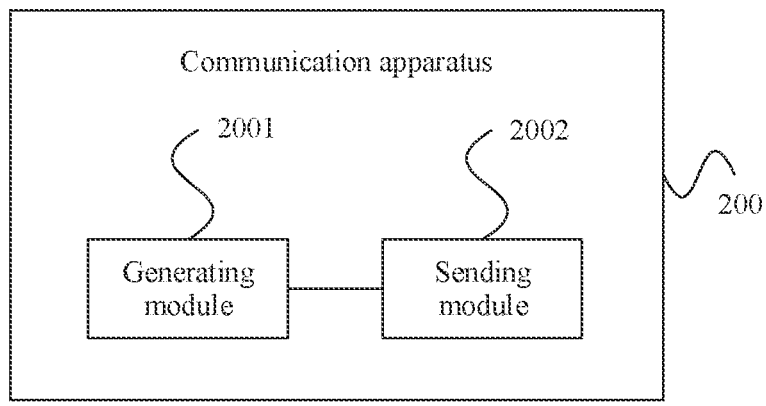
FIG. 20 is a schematic diagram depicting a structure of another communication apparatus according to an embodiment of this application.

FIG. 20 is a schematic diagram depicting a structure of another communication apparatus according to an embodiment of this application. As shown in FIG. 20, a communication apparatus 200 includes a generating module 2001 and a sending module 2002. The generating module 2001 is configured to generate a synchronization signal, cell-specific information, and beam-specific information. The sending module 2002 is configured to send a synchronization signal and cell-specific information on a first beam, where the cell-specific information includes indication information, and the indication information indicates whether there is beam-specific information; if the indication information indicates that there is the beam-specific information, the sending module is further configured to send the beam-specific information of the second beam on any second beam; and the synchronization signal, the cell-specific information, and the beam-specific information are used by a receiving apparatus to perform initial access, and the first beam includes a plurality of second beams.

In FIG. 20, the beam-specific information of the second beam further includes at least one of the following: a space identifier, a frequency identifier, a time identifier, a beam-characteristic identifier, a DMRS position identifier, and check information of the second beam.

Optionally, the beam-characteristic identifier identifies at least one of a shape, an opening angle, a timing advance, a polarization manner, or a beam level of the second beam, and the beam level indicates a level of the beam. Optionally, a beam identifier of the second beam includes the time identifier, and at least one of the space identifier and the frequency identifier.

Optionally, the synchronization signal includes at least one of a primary synchronization signal and a secondary synchronization signal.

Optionally, the cell-specific information includes an MIB

Optionally, the cell-specific information is periodic broadcast information.

The communication apparatus in the embodiment shown in FIG. 20 may be configured to perform the technical solution in the foregoing method embodiments. For an implementation principle and a technical effect of the communication apparatus, further refer to related descriptions in the method embodiments. Optionally, the communication apparatus may be a network device, or may be a component (for example, a chip or a circuit) of a network device.

It should be understood that division into the foregoing modules of the communication apparatus shown in FIG. 19 or FIG. 20 is merely logical function division. In actual implementation, all or some of the modules may be integrated into one physical entity, or may be physically separated. In addition, all of the modules may be implemented in a form of software invoked by a processing element or in a form of hardware. Alternatively, some of the modules may be implemented in a form of software invoked by a processing element, and some of the modules may be implemented in a form of hardware. For example, the determining module may be an independent processing element; or may be integrated in a chip of the communication apparatus, for example, a terminal device, for implementation; or moreover, may alternatively be stored in a memory of the communication apparatus in a form of a program, and is invoked by a processing element of the communication apparatus to perform the functions of the foregoing modules. Implementations of other modules are similar. In addition, all or some of the modules may be integrated, or may be implemented independently. The processing element herein may be an integrated circuit and has a signal processing capability. In an implementation process, steps in the foregoing methods or the foregoing modules may be implemented by using a hardware integrated logical circuit in a processing element, or by using instructions in a form of software.

For example, the foregoing modules may be configured as one or more integrated circuits for implementing the foregoing methods, for example, one or more application specific integrated circuits (ASIC), one or more microprocessors (DSP), or one or more field programmable gate arrays (FPGA). For yet another example, when one of the foregoing modules is implemented in a form of a processing element scheduling a program, the processing element may be a general-purpose processor, for example a central processing unit (CPU) or another processor that can invoke the program. For another example, these modules may be integrated together and implemented in a form of a system-on-a-chip (SOC).

Figure 21:
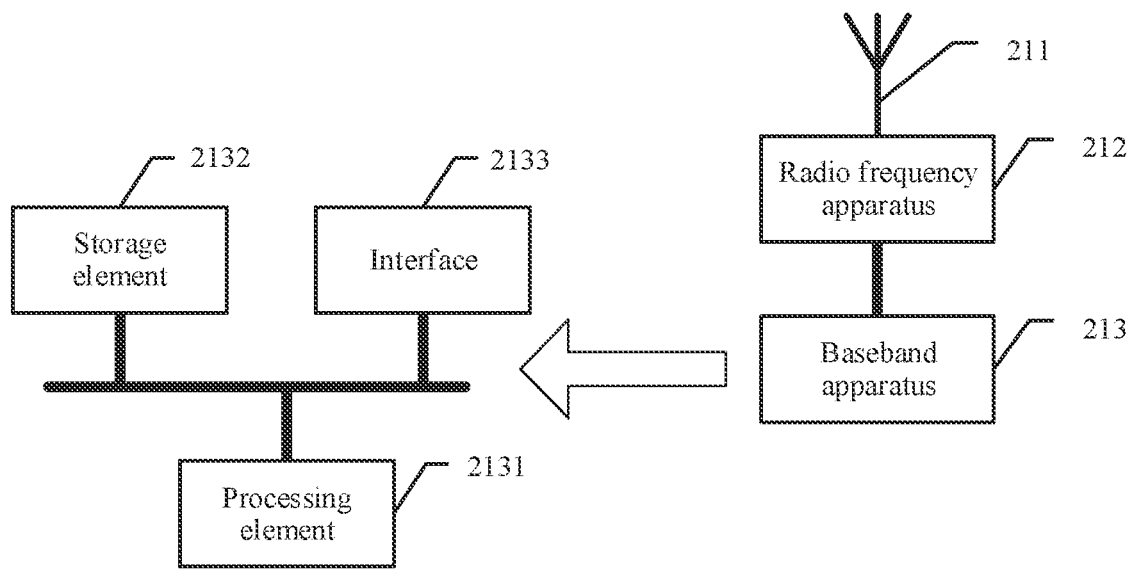
FIG. 21 is a schematic diagram depicting a structure of still another communication apparatus according to an embodiment of this application.

FIG. 21 is a schematic diagram depicting a structure of still another communication apparatus according to an embodiment of this application. The communication apparatus may be a base station. As shown in FIG. 21, the base station includes an antenna 211, a radio frequency apparatus 212, and a baseband apparatus 213. The antenna 211 is connected to the radio frequency apparatus 212. In an uplink direction, the radio frequency apparatus 212 receives, through the antenna 211, information sent by a terminal device, and sends the information sent by the terminal device to the baseband apparatus 213 for processing. In a downlink direction, the baseband apparatus 213 processes information of the terminal device, and sends the processed information to the radio frequency apparatus 212. The radio frequency apparatus 212 processes the information of the terminal device, and sends the processed information to the terminal device through the antenna 211.

The foregoing communication apparatus may be located at the baseband apparatus 213. In an implementation, the foregoing modules are implemented by a processing element scheduling a program. For example, the baseband apparatus 213 includes a processing element and a storage element, and a processing element 2131 invokes a program stored in a storage element 2132, to perform the method in the foregoing method embodiments. In addition, the baseband apparatus 213 may further include an interface 2133, configured to exchange information with the radio frequency apparatus 212. The interface is, for example, a common public radio interface (CPRI).

In another implementation, the foregoing modules may be configured as one or more processing elements to implement the foregoing method, and the processing elements are arranged on the baseband apparatus 213. The processing element herein may be an integrated circuit, for example, one or more ASICs, one or more DSPs, or one or more FPGAs. The integrated circuits may be integrated together to form a chip.

For example, the foregoing modules may be integrated in a form of a system-on-a-chip (SOC). For example, the baseband apparatus 213 includes an SOC chip, configured to implement the foregoing method. The processing element 2131 and the storage element 2132 may be integrated into the chip, and the processing element 2131 invokes the program stored in the storage element 2132, to implement the foregoing method or functions of the foregoing modules. Alternatively, at least one integrated circuit may be integrated in the chip to implement the foregoing method or functions of the foregoing modules. Alternatively, the foregoing implementations may be combined, so that functions of some modules are implemented by the processing element invoking a program, and functions of some modules are implemented by using an integrated circuit.

Regardless of a manner, the communication apparatus includes at least one processing element, a storage element, and a communication interface, and the at least one processing element is configured to perform the method provided in the foregoing method embodiments. The processing element may perform some or all of the steps in the foregoing method embodiments in a first manner of executing the program stored in the storage element, or in a second manner, to be specific, a manner of using a hardware integrated logic circuit in the processing element in combination with instructions. Certainly, the method provided in the foregoing method embodiments may alternatively be performed by combining the first manner with the second manner.

As described above, the processing element herein may be a general-purpose processor, for example, a central processing unit (CPU), or may be one or more integrated circuits configured to implement the foregoing method, for example, one or more application-specific integrated circuits (ASIC), or one or more microprocessors (DSP), or one or more field programmable gate arrays (FPGA). The storage element may be one memory, or may be a general term of a plurality of storage elements.

Figure 22:
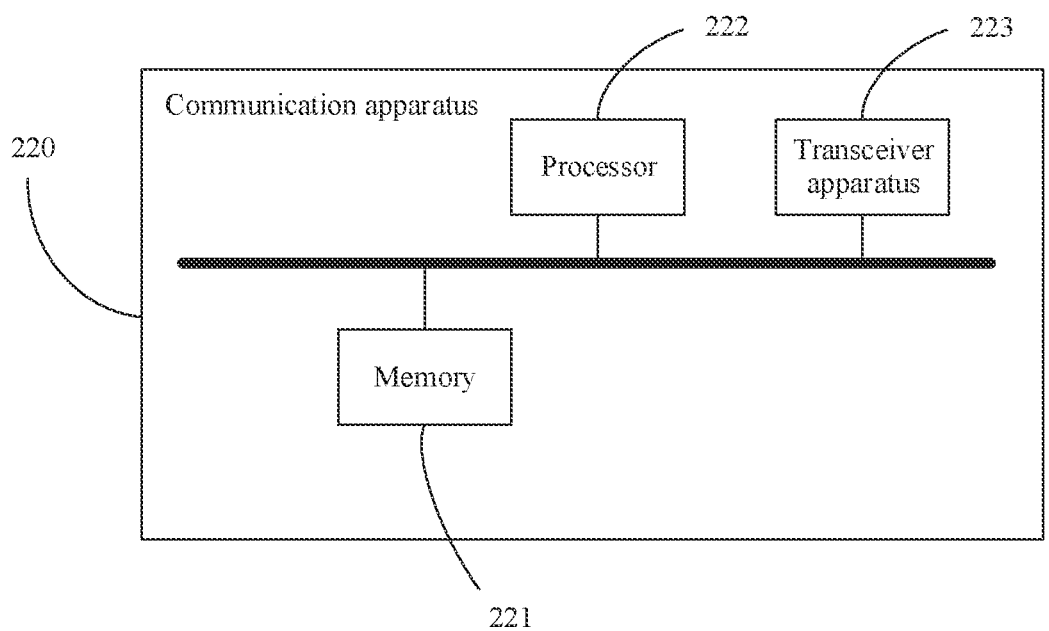
FIG. 22 is a schematic diagram depicting a structure of yet another communication apparatus according to an embodiment of this application.

FIG. 22 is a schematic diagram depicting a structure of yet another communication apparatus according to an embodiment of this application. As shown in FIG. 22, a communication apparatus 220 includes a processor 222 and a transceiver apparatus 223. The transceiver apparatus 223 may also be a transceiver. The transceiver apparatus 223 receives a synchronization signal and cell-specific information sent by a sending apparatus on a first beam, where the cell-specific information includes indication information, and the indication information indicates whether there is beam-specific information; and if the indication information indicates that there is the beam-specific information, the transceiver apparatus 223 is further configured to receive beam-specific information of a second beam sent by the sending apparatus on the second beam, where the synchronization signal, the cell-specific information, and the beam-specific information are used by a receiving apparatus to perform initial access, the first beam includes a plurality of second beams, and the receiving apparatus is within coverage of the second beam. Further, the communication apparatus further includes a memory 221, configured to store a computer program or instructions, and the processor 222 is configured to invoke the computer program or the instructions. The processor 222 and the memory 221 may be integrated together, or may not be integrated together.

The communication apparatus in the embodiment shown in FIG. 22 may be configured to perform the technical solution in the foregoing method embodiments. For an implementation principle and a technical effect of the communication apparatus, further refer to related description in the method embodiments, and details are not described herein again. The communication apparatus may be a terminal device, or may be a component (for example, a chip or a circuit) of the terminal device.

In FIG. 22, the transceiver apparatus 223 may be connected to an antenna. In a downlink direction, the transceiver apparatus 223 receives, through the antenna, information sent by a base station, and sends the information to the processor 222 for processing. In an uplink direction, the processor 222 processes data of the terminal device, and sends the data to the base station through the transceiver apparatus 223.

Optionally, the processor 222 may be configured to implement a corresponding function of the determining module 1902 of the communication apparatus shown in FIG. 19, and the transceiver apparatus may be configured to implement a corresponding function of the receiving module 1901 of the communication apparatus shown in FIG. 19. Alternatively, some or all of the foregoing modules may be implemented in a form of an integrated circuit that is embedded in a chip of the terminal device. In addition, they may be separately implemented, or may be integrated together. In other words, the modules may be configured as one or more integrated circuits for implementing the foregoing method, for example, one or more application specific integrated circuits (ASIC), one or more microprocessors (DSP), or one or more field programmable gate arrays (FPGA).

Embodiments of this application further provide a computer-readable storage medium, including a computer program or instructions. When the computer program or the instructions is/are run on a computer, the information transmission method in the foregoing embodiments is performed.

In addition, embodiment of this application further provide a computer program, including a program or instructions. When the program or the instructions is/are run on a computer, the information transmission method in the foregoing embodiments is performed.

Optionally, all or a part of the computer program may be stored in a storage medium that is packaged together with a processor, or may be stored in a memory that is not packaged together with a processor.

In addition, embodiments of this application further provide a computer program product. The computer program product includes a computer program or instructions. When the computer program or the instructions is/are run on a computer, the information transmission method in the foregoing embodiments is performed.

In addition, embodiment of this application further provide a processor. The processor includes at least one circuit, configured to perform the information transmission method in the foregoing embodiments.

In addition, embodiment of this application further provide a system. The system includes the foregoing terminal device and the network device.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to this application are all or partially generated. The computer may be a general-purpose computer, a dedicated computer, a computer network, or another programmable apparatus. The computer instructions may be stored in the computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Figure 23:
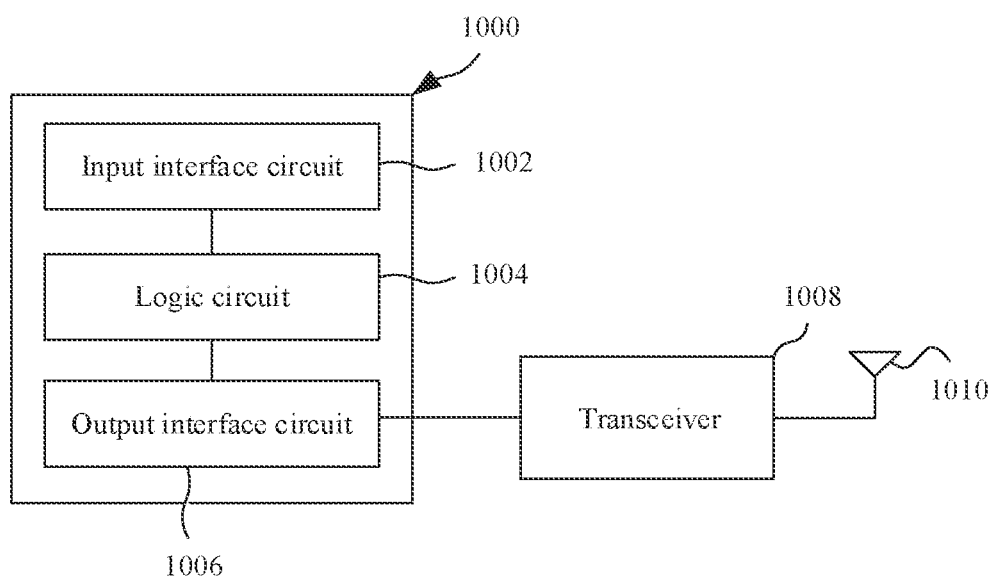
FIG. 23 is a schematic diagram depicting a structure of still yet another communication apparatus according to an embodiment of this application.

Based on a same inventive concept as the method provided in the foregoing embodiments of this application, embodiments of this application further provides a communication apparatus, configured to implement the method in the foregoing embodiments. The communication apparatus may be a terminal device or a network device, or may be a component (for example, a chip or a circuit) of the terminal device or the network device. Some or all of the methods in the foregoing embodiments may be implemented by hardware, or may be implemented by software. When the methods are implemented by hardware, as shown in FIG. 23, a communication apparatus 1000 includes an input interface circuit 1002, a logic circuit 1004, and an output interface circuit 1006. In addition, the communication apparatus 1000 further includes a transceiver 1008 and an antenna 1010. The transceiver 1008 transmits and receives data through the antenna 1010.

When the communication apparatus 1000 is a terminal device, the input interface circuit 1002 may be configured to obtain to-be-processed data, where the to-be-processed data may be, for example, a synchronization signal, cell-specific information, and beam-specific information. The logic circuit 1004 is configured to perform the information transmission method described above, and process the to-be-processed data (for example, the synchronization signal, the cell-specific information, and the beam-specific information) to obtain processed data, where the processed data may be, for example, a beam identifier of the terminal device. Signal quality from a network device received by the terminal device on a beam direction is optimal. The output interface circuit 1006 is configured to output the processed data, for example, the beam identifier.

When the communication apparatus 1000 is a network device, the input interface circuit 1002 may be configured to obtain to-be-processed data, where the to-be-processed data may be, for example, a synchronization signal, cell-specific information, and beam-specific information. The logic circuit 1004 is configured to perform the information transmission method described above, and process the to-be-processed data (for example, the synchronization signal, the cell-specific information, and the beam-specific information) to obtain processed data, where the processed data may be, for example, an identifier of a beam that is in the network device and that is used to send the synchronization signal and the cell-specific information, and an identifier of a beam that is used to send the beam-specific information. The output interface circuit 1006 is configured to output the processed data, for example, an identifier of a beam that is in the network device and that is used to send the synchronization signal and the cell-specific information, and an identifier of a beam that is used to send the beam-specific information.

In a specific implementation, the communication apparatus 1000 may be a chip or an integrated circuit.

What is claimed is:

1. An information transmission method, comprising:
receiving, by a receiving apparatus, a synchronization signal and cell-specific information that are sent by a sending apparatus on a first beam, wherein the cell-specific information comprises indication information, the indication information indicates whether there is beam-specific information of a second beam of a plurality of second beams, and the first beam comprises the plurality of second beams;
in response to determining that the indication information indicates that there is the beam-specific information, receiving, by the receiving apparatus, the beam-specific information of the second beam of the plurality of the second beams, wherein the beam-specific information of the second beam is sent by the sending apparatus on the second beam, the receiving apparatus is within coverage of the second beam, and the beam-specific information of the second beam comprises a space identifier and a beam-characteristic identifier of the second beam, wherein the beam-characteristic identifier identifies at least one of a timing advance, a polarization manner, or a beam level of the second beam;
determining, by the receiving apparatus, an angle of the second beam relative to the sending apparatus based on the space identifier of the second beam; and
performing, by the receiving apparatus, initial access using the synchronization signal, the cell-specific information, the angle of the second beam relative to the sending apparatus, and the beam-specific information of the second beam.

2. The method according to claim 1, wherein the beam-specific information of the second beam comprises at least one of the following:
a frequency identifier, a time identifier, a demodulation reference signal (DMRS) position identifier, and check information of the second beam.

3. The method according to claim 2, wherein the beam-specific information of the second beam comprises the time identifier in addition to the space identifier.

4. The method according to claim 2, wherein the method further comprises:
adjusting, by the receiving apparatus, a beam direction of the receiving apparatus based on location information of the second beam and location information of the receiving apparatus.

5. The method according to claim 1, wherein the beam-characteristic identifier further identifies at least one of a shape or an opening angle of the second beam.

6. The method according to claim 1, wherein the synchronization signal comprises at least one of a primary synchronization signal and a secondary synchronization signal.

7. The method according to claim 1, wherein the cell-specific information comprises a master information block (MIB).

8. The method according to claim 1, wherein the cell-specific information is periodic broadcast information.

9. An information transmission method, comprising:
sending, by a sending apparatus, a synchronization signal and cell-specific information on a first beam, wherein the cell-specific information comprises indication information, the indication information indicates whether there is beam-specific information of a second beam of a plurality of second beams, and the first beam comprises the plurality of second beams; and
in response to determining that the indication information indicates that there is the beam-specific information, sending, by the sending apparatus, the beam-specific information of the second beam of the plurality of second beams in the first beam, wherein the synchronization signal, the cell-specific information, and the beam-specific information of the second beam are used by a receiving apparatus to perform initial access, the receiving apparatus is within coverage of the second beam, the beam-specific information of the second beam comprises a space identifier and a beam-characteristic identifier of the second beam, and the space identifier of the second beam is used by the receiving apparatus to determine an angle of the second beam relative to the sending apparatus, and the beam-characteristic identifier identifies at least one of a timing advance, a polarization manner, or a beam level of the second beam.

10. The method according to claim 9, wherein the beam-specific information of the second beam comprises at least one of the following:
a frequency identifier, a time identifier, a demodulation reference signal (DMRS) position identifier, and check information of the second beam.

11. The method according to claim 10, wherein the beam-specific information of the second beam comprises the time identifier in addition to the space identifier.

12. The method according to claim 9, wherein the beam-characteristic identifier further identifies at least one of a shape or an opening angle of the second beam.

13. The method according to claim 9, wherein the synchronization signal comprises at least one of a primary synchronization signal and a secondary synchronization signal.

14. The method according to claim 9, wherein the cell-specific information comprises a master information block (MIB).

15. The method according to claim 9, wherein the cell-specific information is periodic broadcast information.

16. A communication apparatus, comprising:
an interface and at least one processor, wherein the interface is coupled to the at least one processor; and when executing a computer program or instructions, the at least one processor is enabled to:
receive a synchronization signal and cell-specific information that are sent by a sending apparatus on a first beam, wherein the cell-specific information comprises indication information, the indication information indicates whether there is beam-specific information of a second beam of a plurality of second beams, and the first beam comprises the plurality of second beams;
determine, based on the indication information, whether there is the beam-specific information;
in response to determining that the indication information indicates that there is the beam-specific information, receive the beam-specific information of the second beam of the plurality of the second beams, wherein the beam-specific information of the second beam is sent by the sending apparatus on the second beam, the communication apparatus is within coverage of the second beam, and the beam-specific information of the second beam comprises a space identifier and a beam-characteristic identifier of the second beam, wherein the beam-characteristic identifier identifies at least one of a timing advance, a polarization manner, or a beam level of the second beam;
determine an angle of the second beam relative to the sending apparatus based on the space identifier of the second beam; and
perform initial access using the synchronization signal, the cell-specific information, the angle of the second beam relative to the sending apparatus, and the beam-specific information of the second beam.

17. The communication apparatus according to claim 16, wherein the communication apparatus further comprises at least one non-transitory memory; and
the at least one non-transitory memory is configured to store the computer program or the instructions.

18. The communication apparatus according to claim 16, wherein the beam-specific information of the second beam comprises at least one of the following:
a frequency identifier, a time identifier, a demodulation reference signal (DMRS) position identifier, and check information of the second beam.

19. The communication apparatus according to claim 18, wherein the beam-specific information of the second beam comprises the time identifier in addition to the space identifier.

20. The communication apparatus according to claim 16, wherein the beam-characteristic identifier further identifies at least one of a shape or an opening angle, of the second beam.

* * * * *